US012326340B2

(12) United States Patent
Anderson

(10) Patent No.: US 12,326,340 B2
(45) Date of Patent: Jun. 10, 2025

(54) METHOD AND SYSTEM FOR PLANNING A PATH OF A VEHICLE

(71) Applicant: Deere & Company, Moline, IL (US)

(72) Inventor: Noel W. Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 17/393,921

(22) Filed: Aug. 4, 2021

(65) Prior Publication Data

US 2021/0364314 A1 Nov. 25, 2021

Related U.S. Application Data

(63) Continuation of application No. 16/577,673, filed on Sep. 20, 2019, now Pat. No. 11,112,262.

(51) Int. Cl.
*G06F 3/0482* (2013.01)
*A01B 69/04* (2006.01)
(Continued)

(52) U.S. Cl.
CPC ........ *G01C 21/3664* (2013.01); *A01B 69/008* (2013.01); *A01B 76/00* (2013.01);
(Continued)

(58) Field of Classification Search
CPC ............ G01C 21/3664; G01C 21/3461; A01B 76/00; A01B 79/005; A01B 69/008; A01C 21/00; A01D 75/00; G06F 3/016; G06F 3/0482; G06F 3/167; G10L 15/22; G10L 2015/223; H04W 4/46
See application file for complete search history.

(56) References Cited

U.S. PATENT DOCUMENTS 5,712,782 A 1/1998 Weigelt
6,070,539 A 6/2000 Flamme et al.
(Continued)

FOREIGN PATENT DOCUMENTS

DE 4322293 A1 1/1995
DE 19514223 A1 10/1996
(Continued)

OTHER PUBLICATIONS

European Search Report issued in counterpart application No. 20196050.7 dated Feb. 1, 2021, 6 pages.
(Continued)

*Primary Examiner* — Irete F Ehichioya
*Assistant Examiner* — Jianmei F Duckworth
(74) *Attorney, Agent, or Firm* — Kelly, Holt & Christenson; Joseph R. Kelly

(57) ABSTRACT

One or more processors identify a first set of candidate passes of a second vehicle at a work area to provide area coverage of the work area within an outer boundary of the work area and to avoid contact between one or more components of the second vehicle and plant rows at the work area, based on dimensions of the second vehicle and estimated positions of the plant rows at the work area. A user interface presents, from a first present position and a first present heading of the second vehicle, the identified first set of candidate passes for operator selection of one of the first set of candidate passes as a planned first pass guidance path of the second vehicle.

16 Claims, 11 Drawing Sheets

(51) Int. Cl.

| | | |
|---|---|---|
| *A01B 76/00* | (2006.01) | |
| *A01B 79/00* | (2006.01) | |
| *A01C 21/00* | (2006.01) | |
| *A01D 75/00* | (2006.01) | |
| *G01C 21/34* | (2006.01) | |
| *G01C 21/36* | (2006.01) | |
| *G06F 3/01* | (2006.01) | |
| *G06F 3/16* | (2006.01) | |
| *G10L 15/22* | (2006.01) | |
| *H04W 4/46* | (2018.01) | |

(52) U.S. Cl.
CPC ............ *A01B 79/005* (2013.01); *A01C 21/00* (2013.01); *A01D 75/00* (2013.01); *G01C 21/3461* (2013.01); *G06F 3/016* (2013.01); *G06F 3/0482* (2013.01); *G06F 3/167* (2013.01); *G10L 15/22* (2013.01); *G10L 2015/223* (2013.01); *H04W 4/46* (2018.02)

(56) References Cited

U.S. PATENT DOCUMENTS

| | | | |
|---|---|---|---|
| 8,186,288 B2 | 5/2012 | Chinkiwsky | |
| 9,085,303 B2 | 7/2015 | Wolverton et al. | |
| 9,213,905 B2 | 12/2015 | Lange et al. | |
| 9,536,527 B1 | 1/2017 | Carlson | |
| 10,201,121 B1 | 2/2019 | Wilson | |
| 10,408,645 B2 | 9/2019 | Blank et al. | |
| 11,112,262 B2 | 9/2021 | Anderson | |
| 2002/0165649 A1* | 11/2002 | Wilhelm Rekow | G05D 1/0295 701/466 |
| 2006/0119488 A1 | 6/2006 | Hoiness | |
| 2006/0178823 A1 | 8/2006 | Eglington | |
| 2007/0014434 A1* | 1/2007 | Wei | G06V 20/588 382/104 |
| 2009/0118904 A1* | 5/2009 | Birnie | G05D 1/0278 701/41 |
| 2011/0054743 A1 | 3/2011 | Kocer et al. | |
| 2011/0172873 A1 | 7/2011 | Szwabowski et al. | |
| 2011/0259618 A1* | 10/2011 | Zielke | A01B 69/02 172/126 |
| 2012/0237083 A1 | 9/2012 | Lange | |
| 2016/0095274 A1 | 4/2016 | Wendte et al. | |
| 2016/0120097 A1 | 5/2016 | Chahley et al. | |
| 2016/0175869 A1 | 6/2016 | Sullivan et al. | |
| 2017/0082442 A1 | 3/2017 | Anderson | |
| 2017/0090479 A1 | 3/2017 | Wilcox | |
| 2017/0122742 A1* | 5/2017 | Schleicher | A01B 69/008 |
| 2017/0192431 A1 | 7/2017 | Foster et al. | |
| 2017/0311534 A1 | 11/2017 | Rusciolelli et al. | |
| 2018/0014452 A1 | 1/2018 | Starr | |
| 2018/0359904 A1 | 12/2018 | Foster et al. | |
| 2019/0343035 A1 | 11/2019 | Smith et al. | |
| 2020/0257364 A1 | 8/2020 | Strandberg | |
| 2020/0281110 A1 | 9/2020 | McNichois | |
| 2021/0003416 A1* | 1/2021 | Wilson | G05D 1/0219 |
| 2021/0026362 A1* | 1/2021 | Wilson | B60Q 9/008 |
| 2021/0088354 A1 | 3/2021 | Anderson | |
| 2021/0321554 A1 | 10/2021 | Lju | |

FOREIGN PATENT DOCUMENTS

| | | |
|---|---|---|
| EP | 1183929 A2 | 3/2002 |
| EP | 2957969 A1 | 12/2015 |
| EP | 3176665 A2 | 6/2017 |

OTHER PUBLICATIONS

Extended European Search Report and Written Opinion issued in European Patent Application No. 21162352.5, dated Aug. 16, 2021, in 8 pages.
U.S. Appl. No. 16/852,994 Office Action mailed Mar. 29, 2022, 18 pages.
Final Office Action for U.S. Appl. No. 16/852,994 dated Sep. 15, 2022, 19 pages.
U.S. Appl. No. 16/852,994 Notice of Allowance dated May 24, 2023, 9 pages.
Non-Final Office Action for U.S. Appl. No. 16/852,994 dated Dec. 22, 2022, 25 pages.

* cited by examiner

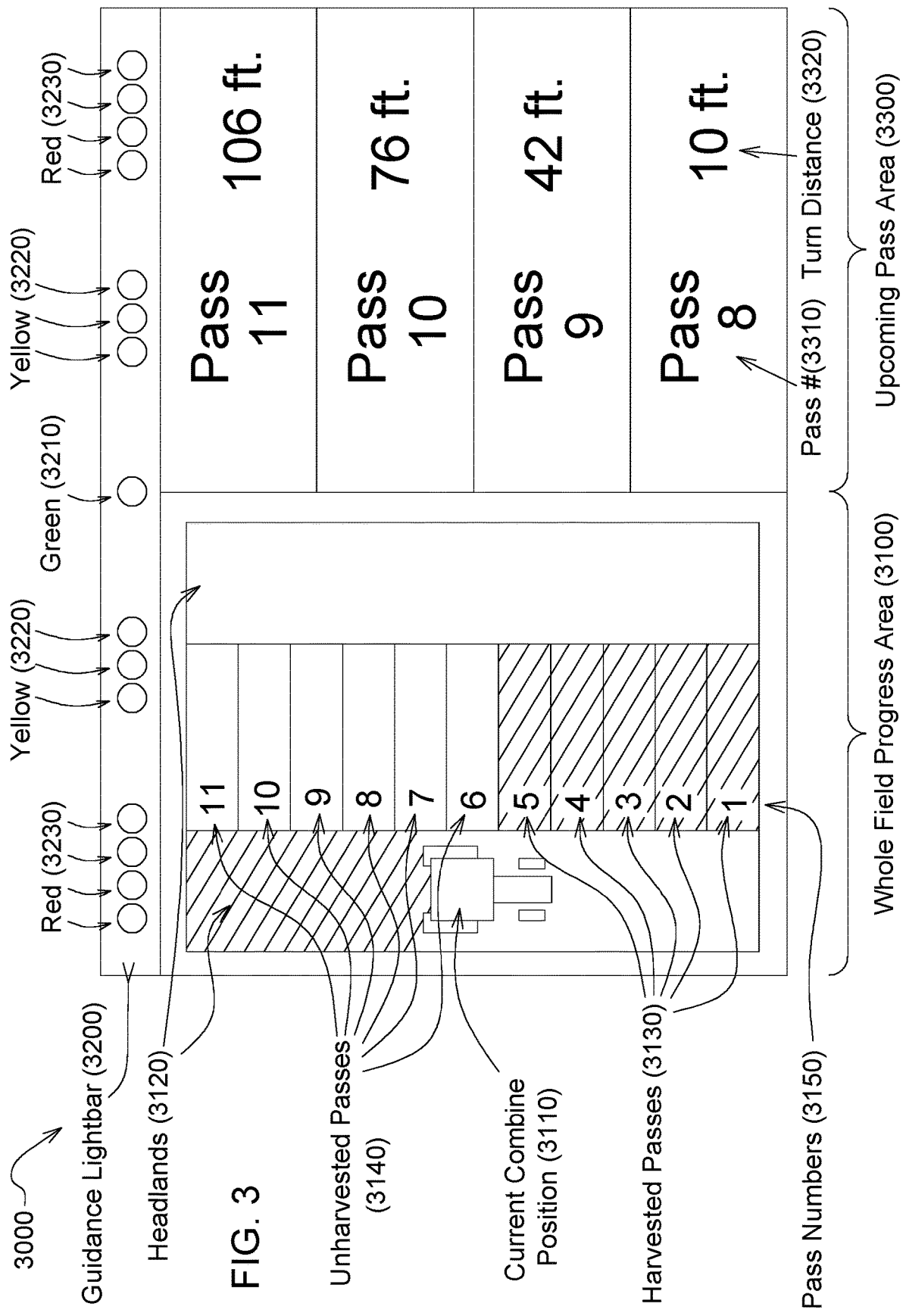

METHOD AND SYSTEM FOR PLANNING A PATH OF A VEHICLE

CROSS-REFERENCE TO RELATED APPLICATION

The present application is a continuation of and claims priority of U.S. patent application Ser. No. 16/577,673, filed Sep. 20, 2019, the content of which is hereby incorporated by reference in its entirety.

FIELD OF THE DESCRIPTION

This disclosure relates to a method and system for planning a path of a vehicle.

BACKGROUND

In certain background art, vehicles determine path plans for covering an area of a field or work area. However, the determined path plans may not provide the operator with the flexibility to adjust the path plan during operation in the field to accommodate remnant areas of the field that have not been processed by the vehicle or equipment. Therefore, there is a need for an improved method and system for planning a path of a vehicle that supports the operator's ability to select dynamically candidate passes within a path plan of the vehicle.

SUMMARY

In accordance with one embodiment, a method and system of planning a path of a vehicle comprises defining or obtaining an outer boundary of a work area or a field. A second data processor of a second vehicle obtains an implement path plan of an implement associated with a first data processor of a first vehicle. The implement path plan comprises a series of recorded position points along a recorded guidance path of an implement and a set of plant rows defined with reference to the recorded guidance path in the work area or the field. A location-determining receiver determines a present position and present heading of a second vehicle in the work area or the field. A second data processor determines candidate passes of the second vehicle in alignment with the defined plant rows to provide area coverage of the work area or field within the defined boundary based on an implement width or swath of the second vehicle and row spacing of the second vehicle, wherein the one or more candidate passes are associated with the defined plant rows consistent with a planned guidance path. From the present position and heading of the second vehicle, a user interface or display displays the determined candidate passes to minimize overlap of adjacent candidate passes of the second vehicle and to minimize any yield loss associated with unharvested/untreated passes or zones within the work area or field. The user interface or display supports selection of one of the displayed or presented candidate passes as the planned guidance path of the second vehicle consistent with the provision of area coverage of the work area or field.

In accordance with another embodiment, one or more processors obtain an outer boundary of a work area, obtain a series of recorded position points of a first vehicle along a recorded guidance path at the work area, and identify plant data indicative of estimated positions of plant rows at the work area based on the series of recorded position points of the first vehicle along the recorded guidance path at the work area and position offsets. The one or more processors further identify present positions and headings of a second vehicle in the work area, and identify a first set of candidate passes of the second vehicle to provide area coverage of the work area within the outer boundary of the work area and to avoid contact between one or more components of the second vehicle and the plant rows, based on dimensions of the second vehicle and the estimated positions of the plant rows at the work area. A user interface presents, from a first present position and a first present heading of the second vehicle, the identified first set of candidate passes for operator selection of one of the first set of candidate passes as a planned first pass guidance path of the second vehicle.

BRIEF DESCRIPTION OF THE DRAWINGS

FIG. 3 is an illustrative embodiment of a possible screen appearing on a display or user interface associated with selection of candidate passes.

DETAILED DESCRIPTION

In one embodiment, the method and system (e.g., 2000 in FIG. 2A or 11 in FIG. 2B) for path planning a path of a vehicle relates to a computer-implemented method and system in which one or more data processors process, store, retrieve, and otherwise manipulate data in communication with one or more data storage devices and networks, as described in this document and the accompanying drawings. As used in this document, "configured to, adapted to, or arranged to" mean that any data processor is programmed with suitable software instructions, software modules, executable code, data libraries, and/or requisite data to execute any referenced functions, mathematical operations, logical operations, calculations, determinations, processes, methods, algorithms, subroutines, or programs that are associated with one or more blocks set forth in any drawing in this document. Alternately, separately from or cumulatively with the above definition, "configured to, adapted to, or arranged to" means that any vehicle electronics or any data processing system (e.g., 11 or 2000) comprises one or more components described herein as software modules, equivalent electronic hardware modules, or both to execute any referenced functions, mathematical operations, calculations, determinations, processes, methods, algorithms, subroutine.

In any of the above referenced drawings of this document, any arrow or line that connects any blocks, components, modules, memory, data storage, data processors, electronic components, or other electronic or software modules may comprise one or more of the following items: a physical path of electrical signals, a physical path of an electromagnetic signal, a logical path for data, one or more data buses, a circuit board trace, a transmission line; a link, call, communication, or data message between software modules, programs, data, or components; or transmission or reception of data messages, software instructions, modules, subroutines or components.

Figure 1A:
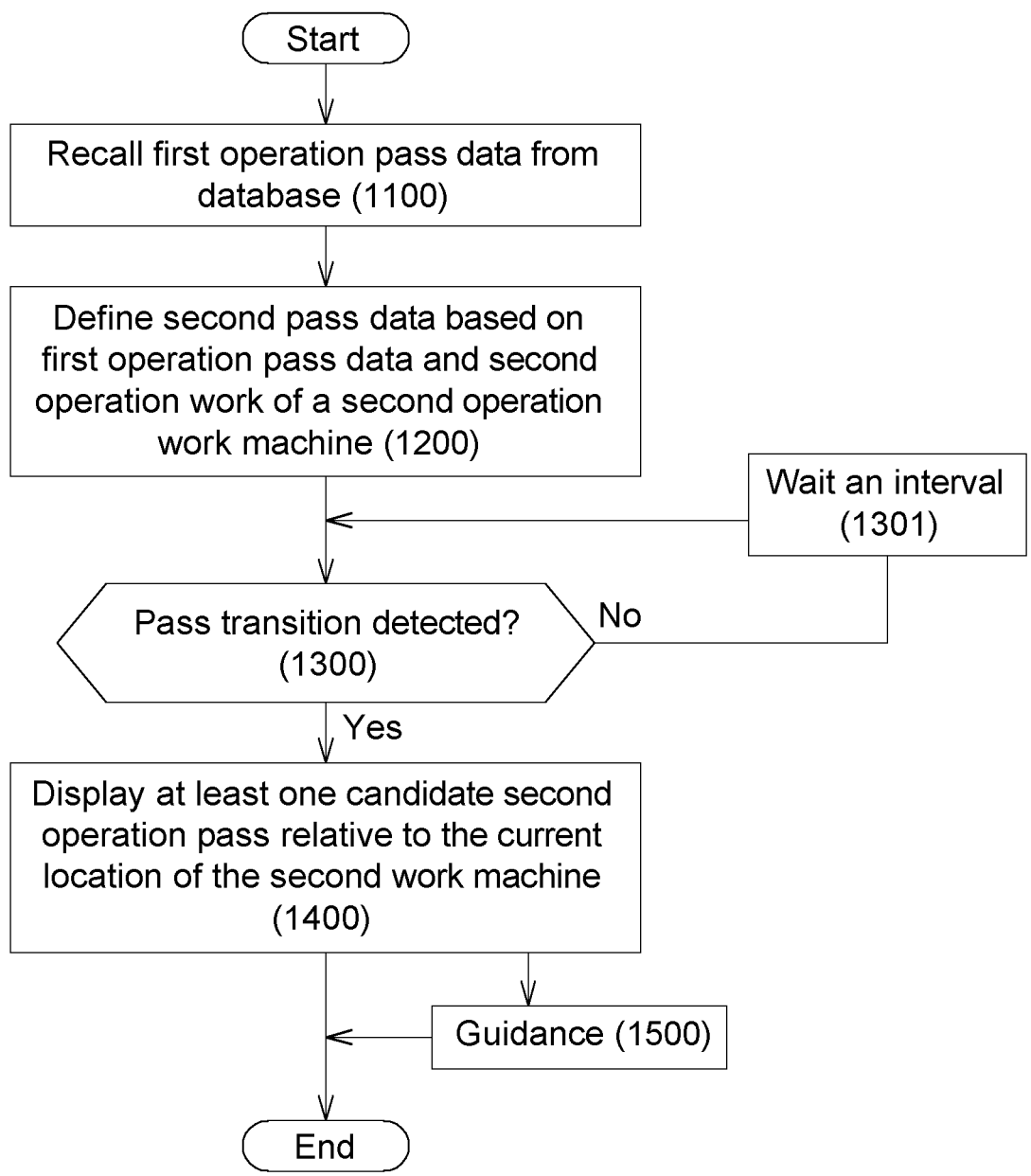
FIG. 1A is a first embodiment of a flow chart of a method for planning a path of a vehicle.

FIG. 1A is a first embodiment of a flow chart of a method for planning a path of a vehicle. The method if FIG. 1A begins in step 1100.

In one embodiment prior to executing step 1100, the first vehicle is associated with a first data processor 22 or first data processing system 20 with first wireless communications device 32 that communicates reference planting information, row position, and/or as-planted plant/seed positions (e.g., coordinates), to a central server 40 associated with a data storage device 44. The first vehicle, its implement or both may be associated with a first location-determining receiver 30 (e.g., Global Navigation Satellite System (GNSS) receiver) for providing actual implement path or path plan followed or tracked by the implement, the first vehicle, or both. Once the actual implement path plan is known, the row position, as-planted plant/seed position, and/or as-planted row information for the crop can be determined or derived from the swath width and row-spacing of the implement or the vehicle. Accordingly, the central server 40, or data processor 42, may store (e.g., in a data storage device 44 or database 46) planting information, an implement path plan, seed or plant position (e.g., coordinates), and/or plant rows defined with reference to the implement path plan, an as-planted map of plant rows, aerial imagery from satellite, aircraft, blimps, or drones, or other reference planting information that can be retrieved, accessed or recalled by the second data processor 54.

In step 1100, a data processor (e.g., second data processor 54 or processor 2100) or data processing system (e.g., second data processing system 52), which is associated with the second vehicle, recalls or obtains (e.g., accesses or retrieves) first operation pass data from a database (e.g., 46 or 2200). In some configurations, the first operation pass data or the database 46 may be stored in a data storage device 44 associated with a central server 40 (remote from the second vehicle) and accessed via wireless communications link (between a second wireless communications device 64 and a wireless communications network 36). In other configurations, the database 46 or first operation data may be stored within a first data storage device 24 of a first data processing system 20 of a first vehicle and accessed, via a wireless communications link or channel between the first wireless communications device 32 and the second wireless communications device 64, by the second data processing system 52 of the second vehicle. For example, in step 1100, the data processor (e.g., second data processor 54) recalls or obtains first pass operation data or other work data from a database (e.g., database 46 or database 2200).

Any database (e.g., 46, 2200) mentioned in this description may be located on a machine, at a remote location, or widely distributed. The first pass operation data or other work data may comprise row crop planting information: (a) recorded by planter implement (e.g., planter, planter row unit, seeding machine), or first vehicle associated with a planter implement, that is equipped with a first location-determining receiver 30 (or GNSS receiver 2160), or (b) obtained from an aerial image of emerged crop of first operation pass data 2210, an imaging device or camera coupled to the data ports 26 of the first data processing system 20 of the first vehicle, or obtained by other methods.

The row spacing/dimensions, number of rows in a field, or the width of the field, work area or worksite actively in-use can be stored in the database (46 or 2200) or data processing system (11 or 2000) for later reference. Further, the swath width of the vehicle (e.g., first vehicle, second vehicle, or both), its implement width, a ground contact pattern of the wheel/tire/tread of the vehicle, and wheelbase dimensions or spatial separation between ground contact zones of the wheel/tire/tread of the vehicle can be stored in the data base (46 or 2200) or data processing system (11 or 2000) for later reference. For example, the first vehicle and the second vehicle may have implements or may have: (a) different (fixed) vehicle width, swath width, implement width, or pass coverage and (b) different (fixed) ground contact pattern of the wheel/tire/tread wheelbase dimensions or spatial separation between ground contact zones of the wheel/tire/tread. Accordingly, the second data processing system 52 can adjust, reconcile or configure its planned path: (1) to align adjacent/adjoining vehicle/implement passes of the second vehicle or second implement with respect to the first vehicle or the first implement, which is previously recorded by the first data processing system 20, (2) to align ground contact zones of the wheel/tire/tread of the second vehicle with respect to plant rows or empty spatial area between adjacent plant rows, (3) to avoid damage from ground contact pattern of the wheel/tire/tread of the second vehicle or its implement (if any) to the plants, plant rows, or seeded ground, and (4) to control the degree or absence of overlap between adjacent/adjoining vehicle/implement passes based on: (a) different vehicle width, swath width, implement width, or pass coverage and (b) different ground contact pattern of the wheel/tire/tread wheelbase dimensions or spatial separation between ground contact zones of the wheel/tire/tread for the first vehicle, the second vehicle and/or its or their implements.

As used herein, the term field may imply a farm or agricultural work area or work site, whereas a work area or worksite may apply to construction, forestry and other areas in which vehicles, implements and equipment can be used in accordance with various embodiments of path planning method and system disclosed in this document. In other examples, other data may be read or retrieved such as the width of an implement (e.g., planter or another implement associated with the first pass operation or first vehicle) or machine (e.g., first vehicle) making an initial or baseline pass through the worksite or field.

In step 1200, a data processor (e.g., second data processor 54, second data processing system 52, or processor 2100) defines second pass data based on first operation pass data (e.g., of a first vehicle or its implement) and second operation work or work task (e.g., of a second vehicle). In step 1200, candidate passes for the second operation are defined, using the first operation pass data or other work data obtained or recalled in step 1100 and vehicle information (e.g., about the machine(s) (e.g., second vehicle(s)) being used in the second operation pass data 2110.

In one embodiment, the second vehicle may comprise a sprayer, nutrient applicator, cultivator, harvester or combine, for example. The second operation work or work task may comprise spraying chemical or crop inputs, applying nutrients, cultivating soil, and/or harvesting crops. The implement associated with the first vehicle and the second vehicle may have different row widths, different swath widths, and different wheel or track separations that require consideration in preserving crop or plants and avoiding damage to the crops or plants during spraying or cultivation. In one non-limiting example, under the first operation pass data a field may have been planted using an N-row planter (e.g., where N is any whole positive number equal to or greater than one, and where the planter is a towed implement of the first vehicle). For instance, if N equals eight, the implement comprises an eight-row planter.

Under a second operation pass data, later operations may include any of the following work tasks associated with a second vehicle: (a) nutrient application (e.g., side-dress fertilizer application) of up to M plant rows (e.g., where M is any whole positive number, such as eight) for a pass or swath of the second vehicle, (b) spraying of up to P rows (e.g., where P is any whole positive number, such as 24), and (c) harvest of up to Q rows (e.g., where Q is any whole positive number, such as sixteen), where row units can be activated, deactivated and/or adjusted dynamically, separately or jointly as any vehicle or its implement travels through the field or work area. In any example set forth in the drawings, the first vehicle and the second vehicle may be configured as a same base vehicle with interchangeable, removable implements to accomplish different tasks, such as planting, cultivating, fertilizing, spraying and harvesting.

In step 1300, the data processor (e.g., second data processor 54, second data processing system 52, or data processor 2100) determines whether or not a pass transition is detected. If the pass transition is detected, the method continues with step 1400. However, if the pass transition is not detected, in step 1301 the method waits for an interval or sampling period and thereafter seeks to detect a new pass transition by again executing step 1300.

In the second data processing system 52, the data processor (e.g., second data processor 54 or data processor 2100) operates in conjunction with a location-determining receiver (e.g., second location-determining receiver 62 or GNSS receiver 2160) to detect the pass transition. For example, once the location-determining receiver (e.g., second location-determining receiver 62 or GNSS receiver 2160) recognizes that the second vehicle has entered into a turn or is approaching an end of a row or an edge of a field, a waterway, obstruction or hazard, the data processor (e.g., second data processor 54, second data processing system 52 or data processor 2100) may detect a pass transition.

In alternate embodiments, step 1300 may use a location-determining receiver (e.g., GNSS receiver 2160), a dead-reckoning sensor 2170, an odometer, stereo vision sensor, imaging system with landmark/symbol recognition, or another location sensor. Current machine location 2130, current machine orientation 2140 (e.g., heading, yaw angle, tilt angle and/or roll angle) are known from a location-determining receiver (e.g., GNSS receiver 2160); an inertial measurement unit, dead reckoning sensor 2170 (e.g., odometer, electronic compass, steering angle sensor, and header up sensor); or any other suitable devices for position detection, attitude detection or pose detection.

Step 1300 can detect or identify pass transitions in accordance with various examples, which can be applied separately or cumulatively. In the context of harvesting crop, field headlands of a field or work area are typically harvested first to enable movement of machinery (e.g., a combine or harvester) on the field or work area. For instance, the second vehicle or harvester completes a pass, enters the headland, and moves to the next pass. Headlands may be defined by a human operator or manager on the worksite map or automatically identified by software using features like direction of operation (e.g., planting), and prior cutting of standing crop or clearing of vegetation (e.g., harvest).

In a first example, the second data processor 54, second data processing system 52, or electronic data processor 2100 of the second vehicle, in conjunction with a second location-determining receiver 62 (or GNSS receiver 2160), an accelerometer, an inertial measurement unit (IMU), or another position, motion or attitude sensor, detects a pass transition (e.g., by change in angular heading or yaw) when the second vehicle (e.g., harvester or combine) exits a pass or row at an end of the row, edge of the field or headlands, where a pass transition is likely, such as the headlands. For instance, the second location-determining receiver 62 or second data processor 54 may establish a geo-fenced region, boundary, or set of boundary coordinates that define the position or zone of an end of the row, edge of the field or headlands.

In a second example, the second data processor 54 or second data processing system 52, of the second vehicle, in conjunction with a second location-determining receiver (e.g., 62 or 2160), an accelerometer, an inertial measurement unit (IMU), or another position, motion or attitude sensor, detects a pass transition when the second vehicle (e.g., harvester) crosses or exits a pass or row at an end of the row, edge of the field or headlands with reference to first operation pass data from harvested area 2122 and second operation pass data of candidate passes 2124 in which there is a discontinuity or transition between the first pass and a next pass (e.g., one or more probable candidate passes, possible candidate passes, or favorably ranked candidate passes) of the second vehicle (e.g., harvester or combine). For instance, the location-determining receiver (e.g., 62 or 2160) or data processor (e.g., 54 or 2100) may establish a geo-fenced region, boundary, or set of boundary coordinates that define the position or zone of an end of the row, edge of the field or headlands, such that if the second vehicle leaves or exits the geo-fenced region, boundary, or set of boundary coordinates, the data processor (e.g., 54 or 2100) detects a transition.

In a third example, the data processor (e.g., second data processing system 52 or data processor 2100), in conjunction with a location-determining receiver (e.g., 62 or 2160), an accelerometer, an inertial measurement unit (IMU), or another position, motion or attitude sensor, detects a pass transition when the harvester enters a planted, but unharvested, area (e.g., versus an unplanted area such as a waterway). For instance, the location-determining receiver (e.g., 62 or 2160) or data processor (e.g., 54 or 2100) may establish a geo-fenced region, boundary, or set of boundary coordinates that define the planted, but unharvested area, such that if the second vehicle leaves or exits the geo-fenced region, boundary, or set of boundary coordinates, the data processor (e.g., 54 or 2100) detects a transition.

In a fourth example, the data processor (e.g., second data processing system 52 or data processing system 2000), detects a transition based on sensor data from dead reckoning sensors 2170, or a location-determining receiver (e.g., GNSS receiver 2160), or both indicating that the harvester is turning, such as an orthogonal turn, a key-hole turn, an end-row turn, a row-skipping turn, or another turn in an unharvested area.

In a fifth example, the data processor (e.g., second data processor 54 or data processor 2100) detects a pass transition based on software instructions and available sensor data accessible via a vehicle data bus of the second vehicle, which may include sensors on the implement or the vehicle that are specifically tailored to the worksite and worksite operation. For instance, the vehicle (e.g., second vehicle data electronics or second vehicle data processing system 52) or implement may comprise position data sensors or height data sensors that can detect a height or height state (e.g., lowered state or raised state) of implements or tools (e.g., harvest head, row unit, tillage unit, implement, or the like). Similarly, the vehicle or implement may include data sensors that provide status messages or the state (e.g., active, deactivated, enabled, disabled) of one or more actuators (e.g., planter drive, sprayer nozzle or sets of sprayer nozzles). The above position sensors, height data sensors, or data sensors may be used alone or in conjunction with the position data, heading data, motion data (velocity and acceleration) and attitude data associated with the second vehicle, or its implement.

In step 1400, the data processor (e.g., second data processor 54, second data processing system 52, or data processor 2100) displays, outputs or communicates at least one second candidate operation pass relative with the current location of the second vehicle associated with the second pass, where the second operation pass is associated with performing the second operation work or second operation path. For example, the second data processor 54, the second data processing system 52, or data processor 2100 may provide the second candidate operation pass by a display 2310 of a user interface (e.g., 60 or 2300), an audio output device 2320 of a user interface (e.g., 60 or 2300), a wearable display that communicates wirelessly or directly (via a transmission line, cables or wires) with the user interface (e.g., 60 or 2300) or second data processing system 52, or haptic output device 2330 associated with the steering system 2335 (e.g., steering wheel, steering shaft, electrical motor-assisted steering and hydraulic motor-assisted steering), the seat, or user controls that communicate with the second data processing system 52 or data processor 2100.

Step 1400 is executed once a pass transition has been detected in step 1300. Information about candidate passes 2124 (or next passes) is presented to a person such as a machine operator or a remote machine operator (e.g., overseer) who is able to select (or reject) candidate passes.

In step 1500 for guidance of the second vehicle, the machine operator or remote operator (e.g., machine overseer who monitors or operates the machine through wireless communications) can actively select a preferential pass from a library or set of candidate passes, as the second vehicle progresses through a field or a work site to perform a task, such as coverage of an entire field or field zone with spray or crop inputs, or harvesting of an entire field or field zone.

In one embodiment, in step 1500 the operator's acceptance or rejection may be passive, where a default acceptance or rejection is taken by the second vehicle in the absence of any human intervention, or in the absence of any human selection, command or input during a time window authorized for human intervention). In contrast to passive acceptance or rejection in step 1500, the operator may accept an active guidance command comprising one or more of the following: (a) a gesture of an operator via visual input device 2315 or the user interface (60 or 2300), (b) a spoken word of an operator via audio input device 2325 of the user interface (60 or 2300), alone or together with speech recognition module 2327, (c) a screen input (e.g., contact, tap, swipe) by an operator via touch screen module 2312 of the user interface (60 or 2300), and/or (d) turning or directing (e.g., via steering system 2335) a vehicle (e.g., second vehicle) towards a candidate pass start point, or any other suitable user interface (e.g., 60 or 2300). In one embodiment, the touch screen module 2312 comprises a capacitive, resistive or piezoelectric sensing structure integrated with a display, such as a liquid crystal display or light emitting diode display of the user interface (23, 60, 2300). An audio input device 2325 may comprise one or more of the following: one or more transducers, one or more microphones, one or more audio amplifiers, one or more analog-to-digital converters, one or more digital filters, an encoder, vocoder, digital processing unit or electronic data processor, speech recognition module 2327, software instructions for filtering speech, processing speech, encoding speech and/or decoding speech. An audio output device 2320 may comprise one or more of the following: one or more transducers, one or more speakers, one or more audio amplifiers, one or more analog-to-digital converters, one or more digital filters, a decoder, vocoder, digital processing unit or electronic data processor, speech recognition module 2327, software instructions for filtering speech, processing speech, encoding speech and/or decoding speech.

In step 1500, the data processor (e.g., second data processor 54 or the data processor 2100) guides the vehicle or its implement (e.g., second vehicle) in accordance with the second candidate operation pass selected (e.g., actively or passively) by the operator via the user interface (e.g., 60 via the second data processing system 52 or user interface 2300).

Step 1500 can be executed in accordance with various examples that may be executed separately or cumulatively. Under a first example, if the second vehicle is manned or guided by a human operator, manual pass selection may be done with techniques such as directions or graphics on a dedicated display (e.g., of user interface 60 or a display 2310 of user interface 2300. The display may comprise a light-emitting diode matrix, a liquid crystal display, a video display, a lightbar, or a target guidance image that is displayed on a display 2310 of the user interface (e.g., 28, 60, 2300). The selection of the next pass or preferential pass from candidate passes can be augmented or supplemented by one or more of the following: (a) visual data (e.g., three-dimensional images, differential stereo images, or tagging/identification of candidate passes or scene items), such as visual display 3000; (b) a wearable display (e.g., glasses, goggles, visor, or three-dimensional or stereo vision visor), with or without scene augmentation (e.g., Google Glass); (c) audio instructions via operator or user communication via audio output device 2320 and/or audio input device 2325 of the user interface 2300 (e.g., voice, stereo, frequency, or amplitude modulated tones/output), (d) haptic instructions via haptic output device 2330 (e.g., right and left vibration, shifting, or other operator movement of the operator seat, steering wheel resistance/vibration/shaking), or any suitable device or method of informing the operator to select a preferential pass, to engage or orient heading and position for guidance, or the start of the selected next pass or preferential pass from the candidate passes.

Under a second example, once a next pass or preferential pass has been selected (from the candidate passes) by an operator or the second data processing system 52, the second vehicle is guided to the start of the next pass or preferential pass. In one embodiment, the second data processing system 52 or data processor 2100 has software instructions that not only move or direct the second vehicle to the start of the next pass or preferential pass, but also orient, register and/or align correctly the heading (e.g., yaw angle) or attitude of the second vehicle and/or its implement with the next pass and any work objects such as standing crop. The attitude may include the roll angle, tilt angle and yaw angle of the second vehicle, for instance.

Under a third example, the second data processing system 52 or data processor 2100 determines a current location (e.g., geographic coordinates) and current orientation (e.g., heading, yaw, pose or attitude) of the second vehicle and next location and next orientation (e.g., starting location and starting orientation) of the preferential pass or next pass. For example, the second data processing system 52 (or data processor 2100) comprises a path planner 2150 and an automated vehicle guidance system 2400 to direct (e.g., to steer, guide, and control movement) the work machine (e.g., second vehicle, its implement, or both) in accordance with one or more of the following: (1) the current location (e.g., geographic coordinates) and current orientation (e.g., heading, pose or attitude) of the second vehicle and next location (e.g., starting location or next geographic coordinates) and next orientation (e.g., starting orientation or next heading) of the preferential pass or next pass, and/or (2) a difference between the current location (e.g., present geographic coordinates) and current orientation (e.g., present heading, present pose or present attitude) of the second vehicle and next location (e.g., target or next location or next geographic coordinates) and next orientation (e.g., target or next orientation, pose, attitude or next heading) of the preferential pass or next pass.

In practice in FIG. 1A, the above steps 1100, 1200, 1300, 1400 and 1500 may form one iteration of a process that can be repeated as the second vehicle progresses through a field or work area to repeatedly or iteratively select a pass transition from a library or set of possible transitions to effectively cover or address a work task associated with one or more target zones of a field or work area, or an entire field or work area.

Figure 1B:
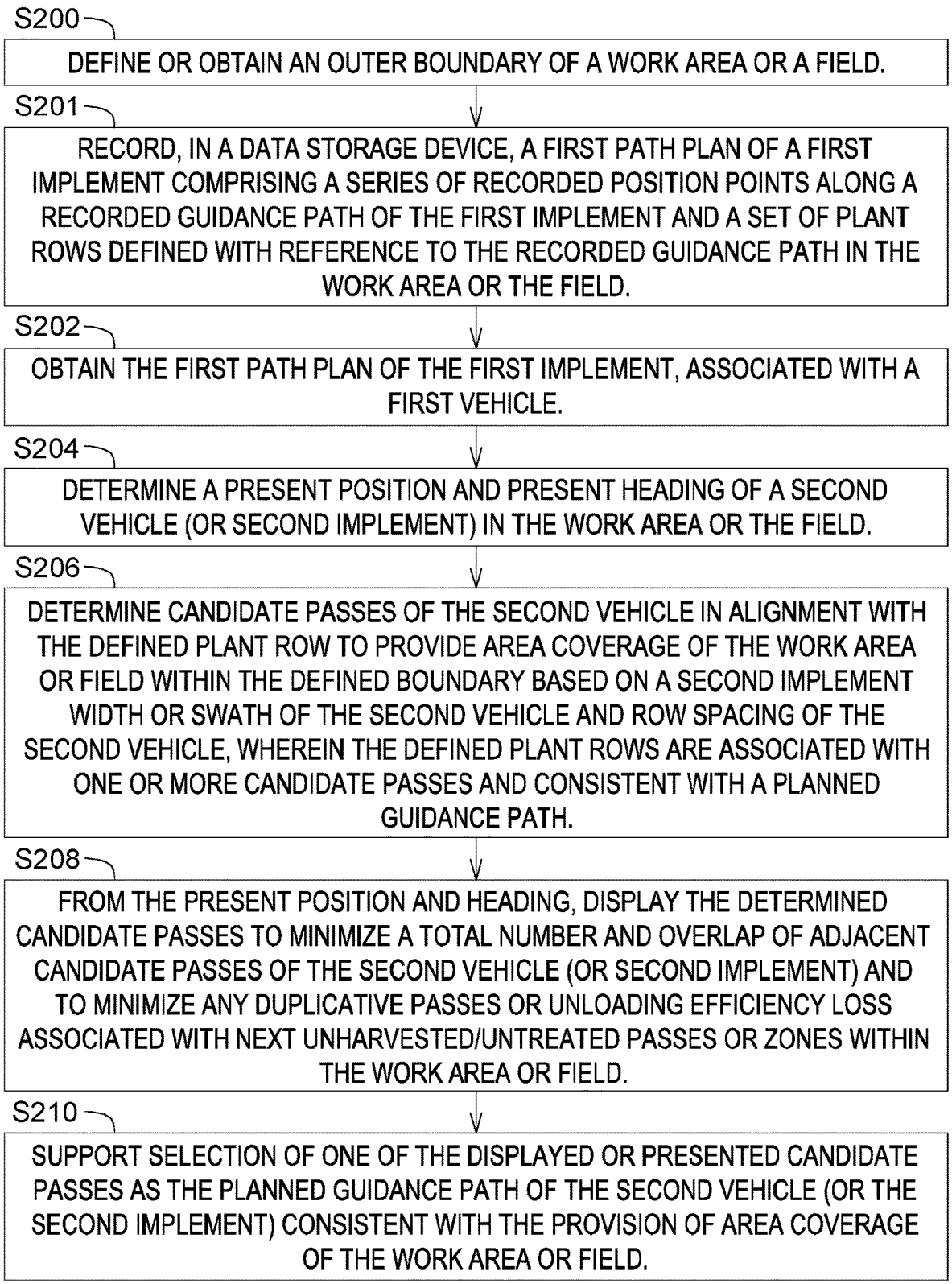
FIG. 1B is a second embodiment of a flow chart of a method for planning a path of a vehicle.

In FIG. 1B the method for path planning a path begins in step S200.

In step S200, the outer boundary of a work area or a field is defined or obtained. The outer boundary of a work area or field may be defined or obtained by various techniques, which may be applied alternately or cumulatively. Under a first technique, the first data processing system 20 or another data processing system may define or obtain an outer boundary of a work area, where the first vehicle is directed or controlled to conduct a survey in which a first location-determining receiver 30 (e.g., global navigation satellite system (GNSS) receiver) records coordinates (e.g., two or three-dimensional coordinates) as the first location-determining receiver 30 tracks or follows the boundary of the work area or field. Here, the first location—determining receiver 30 or its antenna is typically positioned on the first vehicle, although in alternate configurations the first location-determining receiver 30 may be positioned on an implement associated with or towed by the first vehicle.

Under a second technique for executing step S200, the outer boundary of a work area or field may be defined by remote-sensing, such as aerial imaging, satellite imaging, drone imaging, or by reference to publicly accessible field boundary data, such as county records, governmental records or crop insurance records. The first data processing system 20 may supplement or augment the above remotely sensed data (or publicly accessible field boundary data) with additional location data; a set of coordinates collected, along part or all of the boundary; location data collected incidental to a survey, such as noted above under the first technique. Further, the first data processing system 20 may use the set of coordinates collected along part or all of the boundary incidental to a survey to correct, adjust or true the remotely sensed data with any position offset (e.g., compensating adjustment to reduce position error) to reflect real world coordinates of points on or along the boundary (e.g., where boundaries have changed because changes in the paths of streams, creeks, rivers or waterways, or where effective boundaries have changed from clearing of trees or adding of drain tile).

Under a third technique, the first vehicle is controlled such that its implement follows, tracks the boundary while the first vehicle drives the boundary of the work area or field to acquire coordinates or a series of points that lie on the outer boundary. For example, the first location-determining receiver 30 or its antenna may be positioned on the implement, or towed implement rather than on the first vehicle.

Under fourth technique, the outer boundary may be defined by curves or linear segments that interconnect the series of points that lie on the outer boundary. Under a fifth technique, the outer boundaries can be obtained by averaging or combining two or more of the following data sets or layers of data: survey coordinates of GNSS receiver, aerial coordinates obtained from aerial imaging, distance measurements from dead-reckoning sensors (e.g., odometry), and governmental/insurance coordinates.

In step S201, a first data processing system 20, a first processor 22, and/or a first location-determining receiver 30 records or collects a first path plan (e.g., an implement path plan) of the first vehicle or its implement, consistent with the outer boundary of the work area or field. In one configuration, the first data processor 22 of the first vehicle records, collects or obtains previously recorded first path plan (e.g., implement path plan) of an implement associated with a first vehicle, while the first vehicle is or was performing a previous work task in the field or work area. For example, the first data processor 22 of a first vehicle records an implement path plan (e.g., a set of locations, corresponding headings or corresponding attitudes, and ground speed or velocity) or other work data (e.g., implement-related data such as seed spacing, seed type, seed planting density or as-planted or row position data) in a first data storage device 24 onboard the first vehicle, a data storage device 44 associated with a central server 40, or both. In another configuration, the implement path plan could be a pre-established path plan, a preset user-definable path plan or an a priori path plan used to guide the first vehicle (or its implement) through the field or worksite, rather than in situ record of an actual path taken by the first vehicle (or its implement). The central server 40 is remote from a first location-determining receiver 30 and the first data processing system 20 is associated with a first wireless communications device 32 or wireless communications link to facilitate wireless communications channel between the first data processing system 20 and the central server 40.

In one embodiment, the first path plan or the implement path plan relates to an implement associated with a first vehicle. The implement path plan comprises a series of recorded position points along a recorded guidance path of an implement and a set of plant rows defined with reference to the recorded guidance path in the work area or the field. In one configuration, the first path plan of the implement is defined by actual passes in the work area or the field during a planting operation (e.g., recorded by the first location-determining receiver 30); wherein the recorded position points comprise Global Navigation Satellite System (GNSS)

coordinates (e.g., Precise Point Positioning (PPP) or Real-time Kinematic (RTK) coordinates within a same growing season). One or more antennas associated with the first location-determining receiver 30 may be mounted on the first vehicle, the implement, or both to provide position, attitude and/or motion data associated with the first vehicle, its implement, or both.

In some embodiments, the positions of the plant rows are established by lateral offsets or other position offsets with reference to the first path plan or implement path (e.g., of the first vehicle). For instance, the first data processing system 20, the second data processing system 52, or both establish or estimate an implement width or swath width of implement and row spacing or the row spacing of the implement and the number of rows with reference to an actual recorded implement path (e.g., of the first vehicle and the second vehicle). The implement width or swath width may differ with different implements that are used for planting, spraying or harvesting, or other agricultural tasks, for example.

In step S202, a second data processor 54 of a second vehicle obtains a first path plan of an implement (e.g., an implement path plan) associated with, recorded by or collected by a first data processing system 20, a first processor 22, and/or a first location-determining receiver 30 of a first vehicle, or its implement, consistent with the outer boundary of the work area or field. For example, the second data processor 54 may access, retrieve or obtain stored implement path plan data or other work data from any of the following: (a) a central server 40, (b) a data storage device 44 associated with the central server 40, (c) a first data storage device 24 in the first data processing system 20, or (d) a database 46.

In step S204, a second location-determining receiver 62 (e.g., or GNSS receiver 2160) determines a present position and present attitude (e.g., yaw or heading angle) of a second vehicle, or its implement, in the work area or the field. For example, the second location-determining receiver 62 determines (and records) a set of present positions and present attitudes of the second vehicle, or its implement as the implement progresses through the work area or field.

In step S206, a second data processor 54 or second data processing system 52 determines candidate passes of the second vehicle, and/or its implement, in alignment with the defined plant row or rows to provide area coverage of the work area or field within the defined boundary based on an implement width or swath of the second vehicle and row spacing of the second vehicle, wherein the one or more candidate passes are associated with the defined plant rows consistent with a planned guidance path. In one embodiment, the respective positions of defined plant rows (e.g., as-planted data) can be communicated wirelessly from the central server 40 or from the first data processing system 20, where the positions of the plant rows, segments of plant rows or individual plants are defined by two or three dimensional coordinates or points lying on or within plant rows, or an outer extent of the foliage of the plants.

In one configuration, the planned guidance path means an actual recorded guidance path of the first vehicle or its implement, which is recorded by the first data processing system 20 or the first location-determining receiver 30). In one example, the planned guidance path may be defined as set of points along the ground that lie on or intercept a longitudinal centerline (e.g., or a vertical plane extending through the longitudinal centerline) of the second vehicle, or a reference point on the second vehicle, or its implement. The planned guidance path may be defined a series of points (e.g., GNSS two-dimensional or three dimensional coordinates), or by linear segments and curved segments that interconnect such points.

In step S206, the second data processing system or second data processor can determine candidate passes of the second vehicle, or its implement in accordance with various techniques that may be applied alternately or cumulatively.

Under a first technique, the second data processing system 52 or the path planner 2150, adjusts or processes the planned guidance path such that an implement or towed implement associated with the second vehicle tracks the defined plant rows (e.g., communicated wirelessly from the central server 40 or from the first vehicle) to provide area coverage of the work area or field within the defined boundary based on an implement width or swath of the second implement and row spacing of the plant rows (e.g., recorded or entered plant row spacing).

Under a second technique, the second implement may have a different swath width or implement width from the first implement, even if the row spacing (e.g., row-to-row lateral width) of the first implement and the second implement are identical; therefor, the number of passes to cover, harvest, spray, treat a field may differ from the number of passes/rows to plant the same field, along with any optional or potential allowances for overlap of passes/rows to assure complete and continuous coverage of a zone, field or work area.

In step S208, from the present position and heading of the second vehicle, a user interface 60, user interface 2300 or display 2310 displays the determined candidate passes: (a) to meet a target overlap (e.g., target overlap metric), such as minimizing the overlap of adjacent candidate passes of the second vehicle (or its implement), (b) to meet a target total number of passes of the second vehicle (or its implement) to cover the work area or field, (c) to minimize any duplicative passes or unloading efficiency loss (e.g., fuel or energy loss) associated with duplicative or return trips to cover or harvest next unharvested/untreated passes or zones within the work area or field, and/or (d) to track a target path plan, to meet an error reduction or efficiency target, or another preestablished objective. For example, the target overlap may be set to zero or a target lateral offset or set to compensate for an average, median, or mode error in position (e.g., lateral position) precision of the location-determining receiver (e.g., second location determining receiver 62, or the aggregate error contributions of the first location determining receiver 30 and the second location determining receiver 62). The target overlap or target lateral offset maybe specified, measured or inputted in the user interface (28, 60, 2300) in dimensions (e.g., meters) or percentage overlap of an entire vehicle swath width or implement swath width. Step S208 is well suited for minimizing the total number of passes and enhancing efficiency (e g minimizing fuel and time) for a field, work area or selected zone of field, by: (a) eliminating unnecessary, overlapping, duplicative or return row passes to clean up (or to completely harvest or fully process) the field or work area; (B) avoiding or reducing the need to interrupt harvesting to unload or transfer harvested agricultural material (e.g., harvested grain, oilseed or fiber) to a cart, truck or storage container part way through a pass and then return to resume harvesting mid-pass (e.g., retrace vehicle path or partially completed pass).

Step S208 may be carried out in accordance with various techniques, which may be applied separately or cumulatively. Under a first technique, the user interface (28, 60), display 2310 or second data processor 54 of the second data processing system 52 displays, outputs or presents (on a screen or visual display 3000 in FIG. 3) a library or a list or sequence of determined candidate passes with associated corresponding crop yields. The crop yields may be expressed for the pass or on a yield per land unit (e.g., bushel per acre) basis for the pass.

In step S210, the user interface (60, 28) or display 2310 (e.g., with a visual display screen 3000 in FIG. 3) supports operator selection of one of the displayed or presented candidate passes as the planned guidance path (comprising the next pass or preferential pass) of the second vehicle consistent with the provision of area coverage of the work area or field. The user interface (60, 28) or display 2310 of the second data processing system 52 supports selection of the next pass, preferential pass, next row or next portion of the path plan from among a library, list or sequence of determined candidate passes by speech recognition of a pass identifier spoken by a vehicle operator. For example, the user interface (60, 28) of the second data processing system 52 can apply a speech recognition module 2327 (e.g., software and audio input device 2325) to the spoken commands of the vehicle operator to select a next pass, preferential pass, next row or next portion of the path plan of the second vehicle from the library, list or sequence of determined candidate passes. Further, in response to the operator's spoken command or entered command to the user interface (60, 28), the user interface (60, 28) of the second data processing system 52 can confirm the selection of the operator via machine speech of an audio output device 2320 or a haptic output device 2330, which is associated with any of the following: a steering system (e.g., 2335), a steering column, or a seat of the vehicle. Haptic output or feedback can comprise actuators that vibrate, shake or move the steering system (e.g., 2335), steering column, or a seat of the vehicle. For example, the user interface (60, 28), audio output device 2320, haptic output device 2330 can indicate to an operator any of the following feedback (e.g., operator-defined feedback or factory setting feedback): a default selection of a candidate pass as a preferential pass, a vehicle operator has opted out a default selection of the candidate pass as the preferential pass, or the operator has accepted a default selection of the candidate pass as the preferential pass.

Figure 1C:
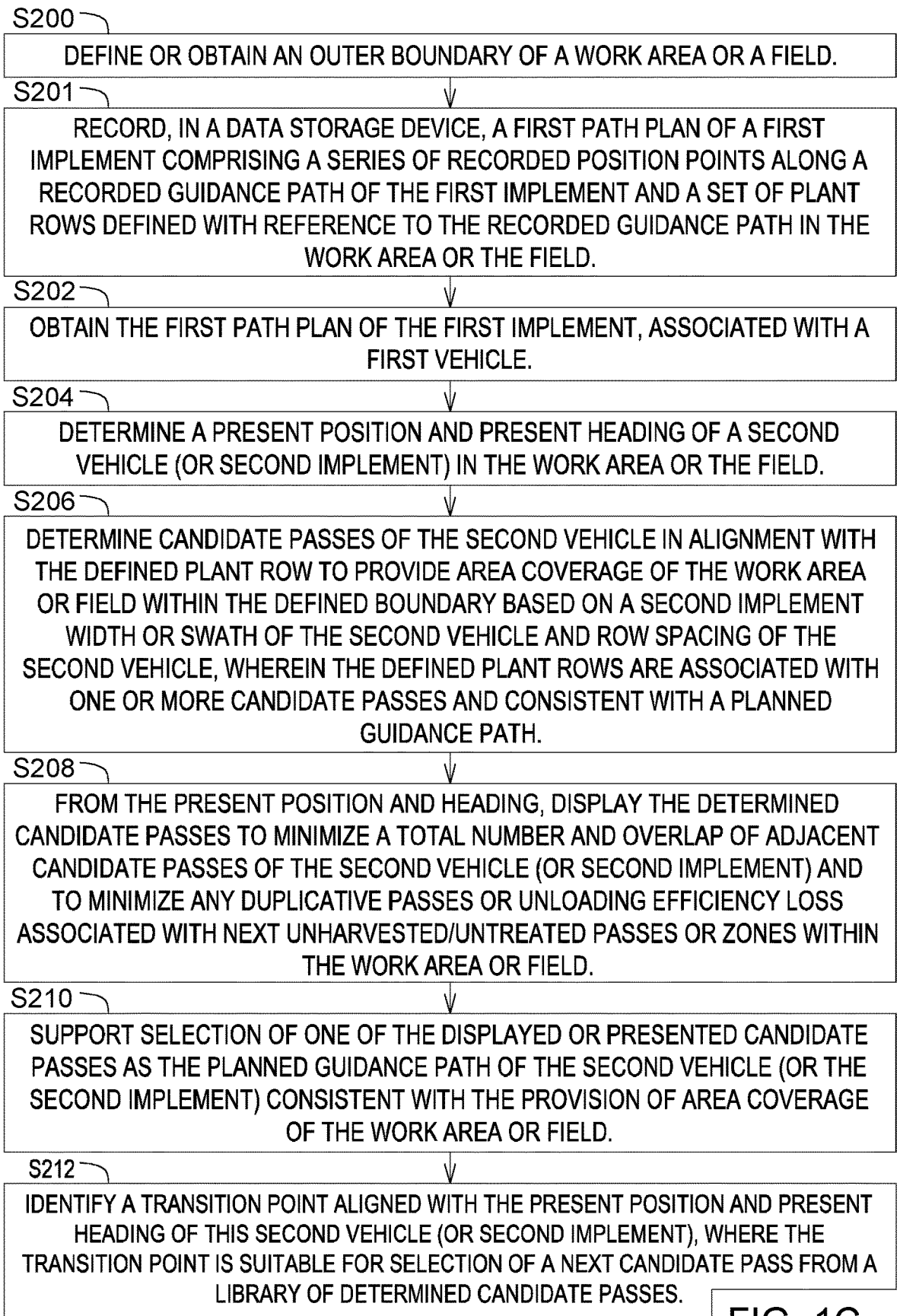
FIG. 1C is a third embodiment of a flow chart of a method for planning a path of a vehicle.

The method of FIG. 1C is similar to the method of FIG. 1B, except the method of FIG. 1C further includes or comprises step S212. Like reference numbers indicate like steps, procedures or features in FIG. 1B and FIG. 1C.

In step S212, the second data processor 54, second data processing system 52, or electronic data processor 2100 in conjunction with the location-determining receiver (e.g., first location-determining receiver 30 or second location-determining receiver 62), identifies a transition point, transition zone, transition range or transition path segment with reference to (e.g., aligned with) the present position (e.g., geographic coordinates) and corresponding present heading, where the transition point is suitable for selection of a next pass or preferential pass from a library of determined candidate passes. The present position and corresponding present heading may align with the current or present position and corresponding attitude (e.g., heading or yaw angle) of the second vehicle or its implement. For example, at the transition point or within the transition zone, transition range or transition path segment, the second data processor 54 or the second data processing system 52 aligns (promptly or timely) the second vehicle, or the its implement, to align or track with a target path, predicted path, or proper path (e.g., as planted map, recorded plant rows, seed positions or plant positions) between the plant rows to avoid damage to the foliage, leaves, stem or stalk, of the plants or seedlings.

Step S212 may be carried out in accordance with various configurations, which may be implemented separately or collectively. In one or more configurations, the library of determined candidate passes refers to the remaining one or more candidate passes that are not yet processed by the second vehicle, or its implement, or traversed by the second vehicle, or its implement. For example, the library of determined candidate passes can refer to one or more of the following candidate passes: (1) for a cultivator, the library includes uncultivated passes within a field, or within an uncultivated zone of the field, that have not been yet cultivated by the second vehicle as the cultivator; (2) for a sprayer, the library includes untreated or unsprayed passes, plant rows or plant regions/zones within the field, that have not yet been treated with chemicals, nutrients, pesticide, fertilizer, insecticide, herbicide, or other crop inputs by the second vehicle as the sprayer; (3) for a nutrient applicator, the library includes untreated or unsprayed passes, plant rows or plant regions/zones that have not yet been treated with chemicals, nutrients, fertilizer, nitrogen, potassium, phosphorus, iron, manganese, copper, magnesium, calcium, trace minerals, or other crop inputs with the second vehicle as the nutrient applicator; (3) for a harvester or combine, the library includes standing crop, standing plant rows or crop regions/zones that have not yet been harvested or cut with the second vehicle as the harvester or combine.

Figure 1D:
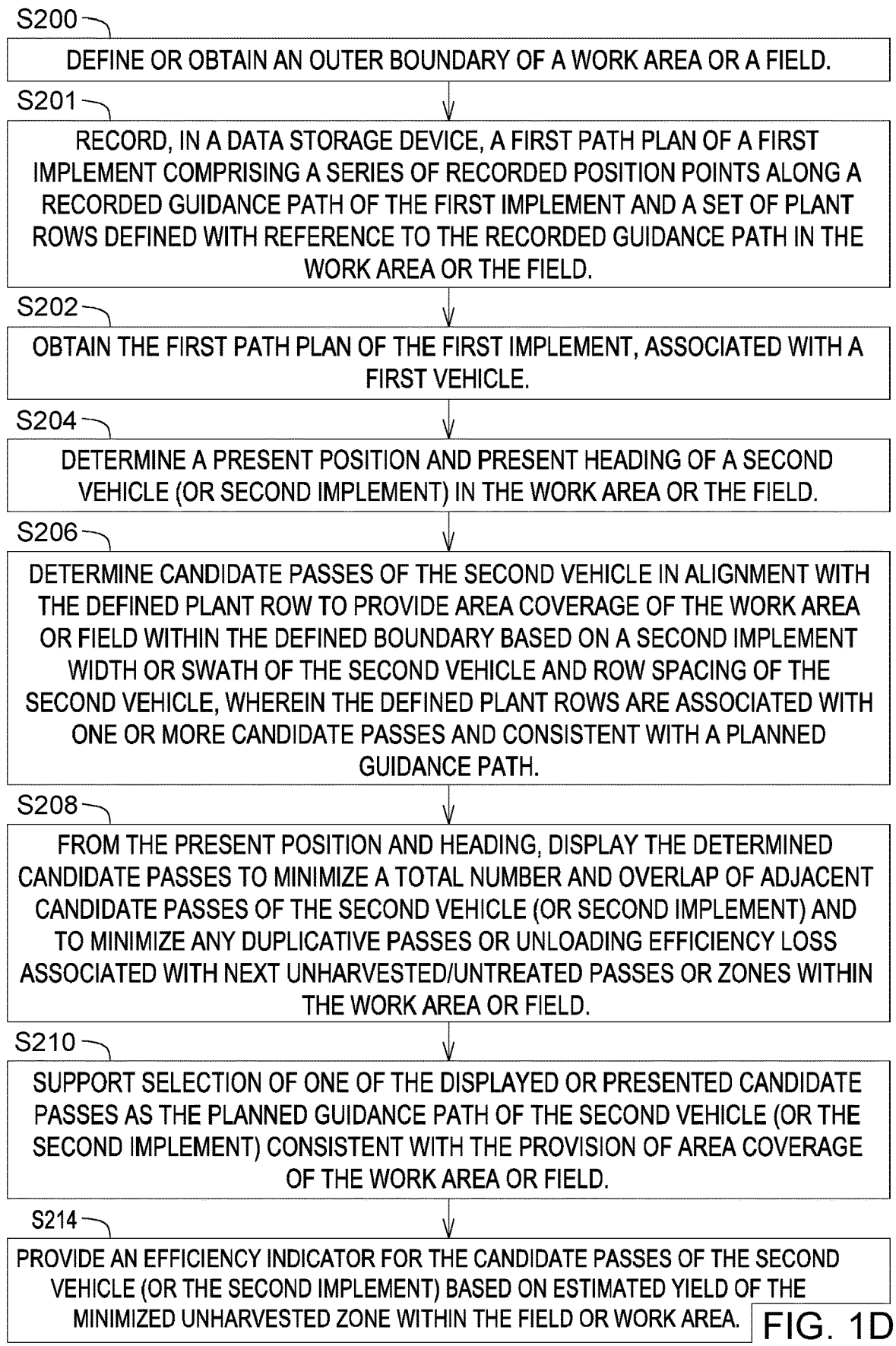
FIG. 1D is a fourth embodiment of a flow chart of a method for planning a path of a vehicle.

The method of FIG. 1D is similar to the method of FIG. 1B, except the method of FIG. 1D further includes or comprises step S214. Like reference numbers indicate like steps, procedures or features in FIG. 1B and FIG. 1D.

In step S214, the user interface (60, 28) or display 2310 (e.g., via visual display 3000 of FIG. 3) provides an efficiency indicator for each corresponding candidate pass based on a respective estimated yield of the unharvested zone (e.g., candidate unharvested pass or candidate unharvested remnant zone) within the field or work area. In one embodiment, the unharvested zone may have an irregular shape that is less than or greater than the width of one pass or swath of the second vehicle, or its implement. Ideally, the unharvested zone would be approximately equal to the width of one pass or multiple adjacent passes of the second vehicle or its implement such that full implement width or capacity of the second vehicle is used efficiently.

Step S214 may be carried out in accordance with various alternate techniques, which may be applied separately or cumulatively. Under a first technique, the user interface (60, 28) or display 2310 (e.g., via visual display 3000 or screen) can provide an efficiency indicator (e.g., score, recommended sequence, or numerical rank) that is proportional to, derived from, or indicative of an estimated yield of the harvested zone less the unharvested zone that remains after the second vehicle or its implement traverses the harvested zone as any number of N passes equal to multiple of passes of the second vehicle, or its implement, where N is any positive whole number greater than zero.

Under a second technique, each candidate pass can be ranked with a score or numerical rank. Under a third technique, the user interface (60, 28) or display 2310 (e.g., via visual display 3000) presents the candidate passes in order or sequence of ascending or descending score or numerical rank. Under a fourth technique, the user interface (60, 28) or display 2310 (e.g., via visual display 3000) provides an efficiency indicator for the candidate passes based on the ratio or percentage of estimated unharvested zone yield to estimated harvested yield for the field or defined section of the field within the defined boundary, where the defined section is defined to be equal to or greater than the area of the unharvested zone and inclusive of the area of the unharvested zone.

Figure 1E:
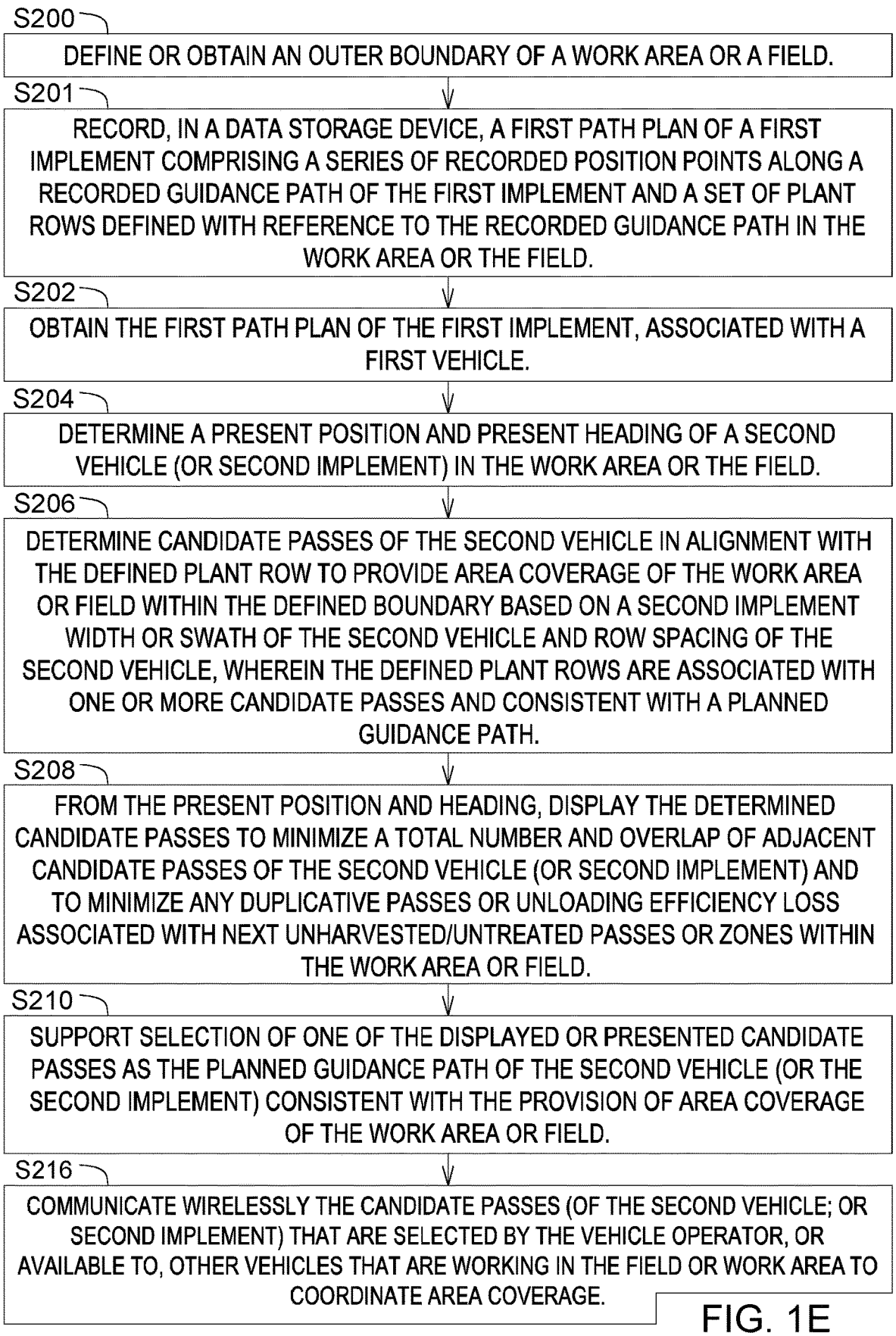
FIG. 1E is a fifth embodiment of a flow chart of a method for planning a path of a vehicle.

The method of FIG. 1E is similar to the method of FIG. 1B, except the method of FIG. 1E further includes or comprises step S216. Like reference numbers indicate like steps, procedures or features.

In step S216, the second vehicle data processing system 52, or a second wireless communication device 64 coupled thereto, communicates wirelessly the candidate passes: (a) to be selected by one or more vehicle operators, or by second data processing systems 52; (b) available to other second vehicles that are working in the field, or work area to coordinate area coverage, (c) that are actually selected as next passes or preferential passes by one or more vehicle operators of second vehicles, or second data processing systems 52. Accordingly, multiple vehicles (e.g., second vehicles) can service simultaneously the field or work area according to a coordinated plan that considers the planned guidance plan of each participating vehicle in conjunction with the unprocessed, untreated or remaining zones within the field or work area. In one configuration, if multiple second vehicles are available or working in the field or a work area, one second wireless communications device 64 can communicate wirelessly to counterpart second wireless communication devices 64 associated with multiple second vehicles working the field to coordinate, claim, unclaim, indicate completion, or indicate abandonment of any respective candidate passes in the field or work area. For example, by group communications via second wireless communication devices 64, a second vehicle can exercise a prior claim (or announce planned or actual processing of) to a next candidate pass or available unclaimed candidate passes prior to the other second vehicles without interference or collision from other vehicles working the field. For example, via its second wireless communication device 64, the second vehicle that is claiming any unavailable unclaimed candidate pass for the next candidate pass can wirelessly communicate a group call message to the group of second vehicles that is working the same field or same work area; such messages can be repeated by the claiming second vehicle until any or all of the non-claiming vehicles within the group provide an appropriate acknowledgement or confirmation. In one embodiment, the central server 40 and the wireless communications network 36 can facilitate storing and forwarding of messages (or deactivation within geofenced zones) for second vehicle data processing systems 52 that have not provided an appropriate acknowledgement or confirmation. In another embodiment, the central servicer 40 can provide management, coordination and clearinghouse activities to a group of second vehicles via second wireless communication devices 64 and the wireless communications network 36 to assign claims to candidate vehicle passes and to track completion of assigned claims of candidate vehicle passes, for example.

Figure 2A:
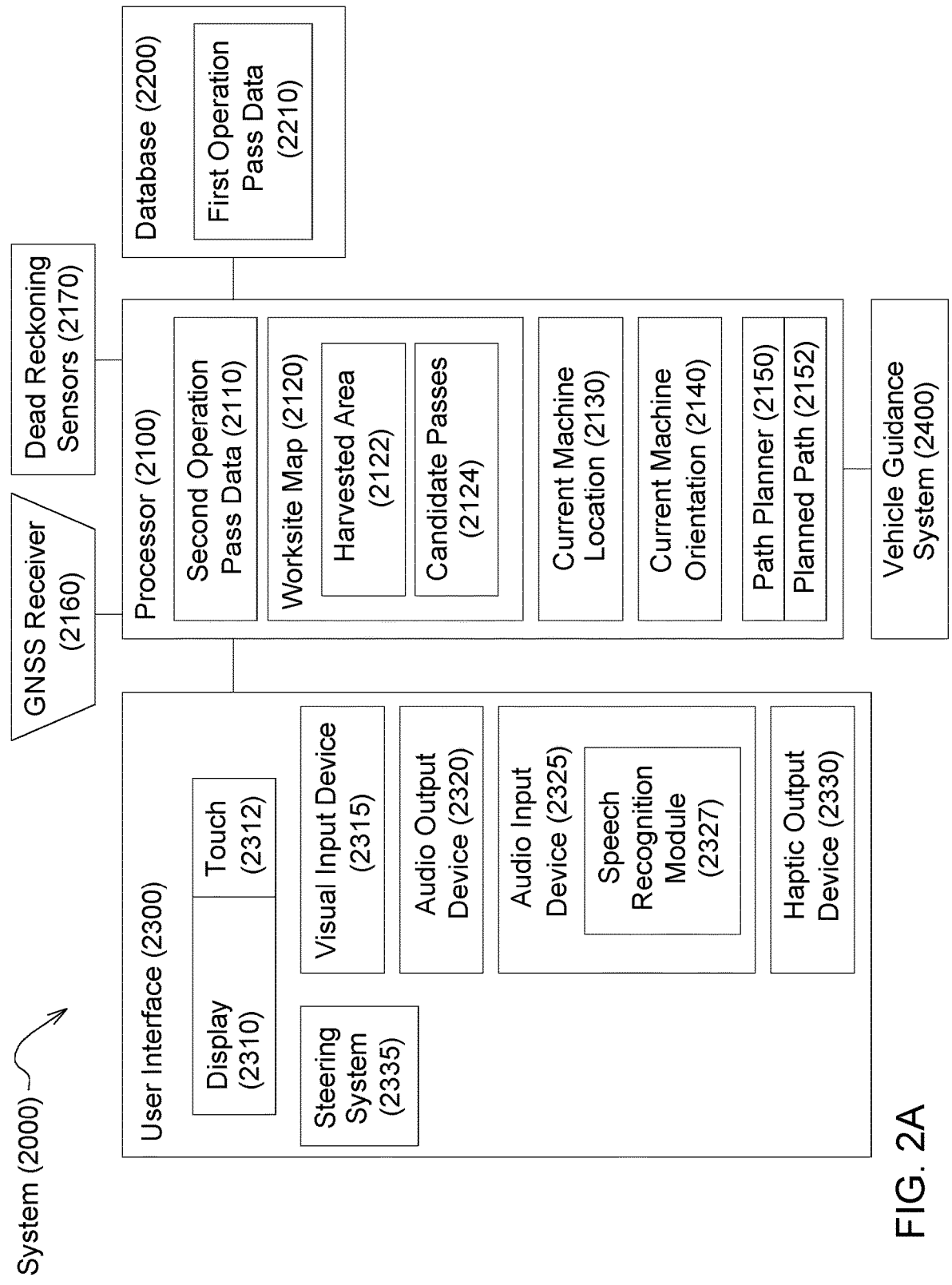
FIG. 2A is one embodiment of a block diagram of a system for planning or executing a path of a vehicle.
Figure 2B:
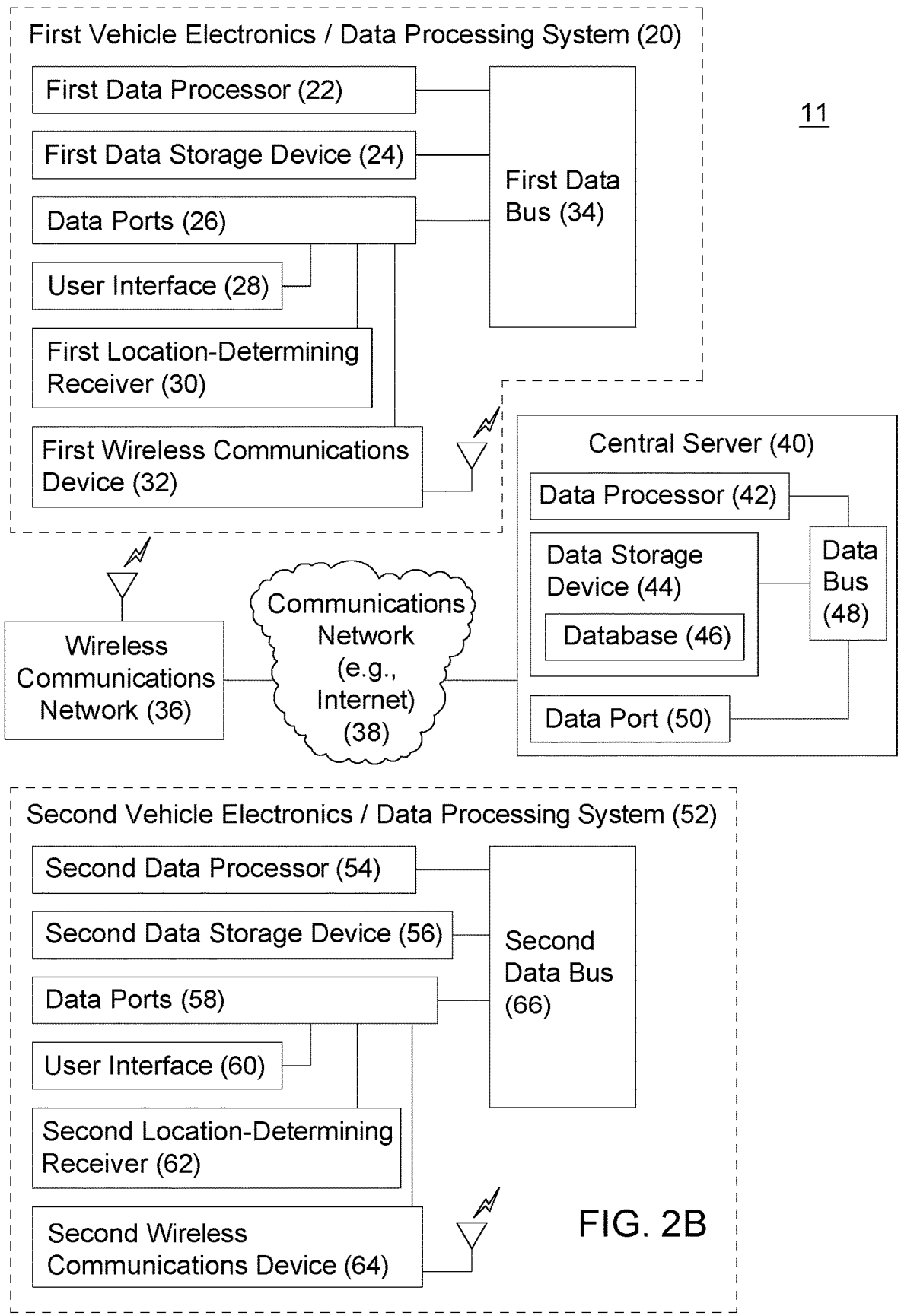
FIG. 2B is another embodiment of a block diagram of a system for planning or executing a path of a vehicle.

FIG. 2A illustrates a block diagram of a data processing system 2000 for planning a path or executing a path of a vehicle. Similarly, FIG. 2B illustrates a block diagram of a data processing system 11 for planning a path or executing a path of a vehicle. The data processing system 2000 of FIG. 2A or the data processing system 11 of FIG. 2B can be applied to one or more vehicles, where each vehicle is equipped with a data processing system (20, 52) that can communicate wirelessly with a database 46 or central server 40. As illustrated in FIG. 2B, the database 46 is co-located or located onboard one or more vehicles. However, the database 46 may be remotely located from the one or more vehicles, where each vehicle is configured with a wireless communication device for communicating with the database 46 in a communications network 38, or a cloud service hosted on one or more servers.

In one embodiment, the data processing system 2000 of FIG. 2A or system 11 of FIG. 2B comprises a user interface (28, 60, 2300), a location-determining receiver (e.g., GNSS receiver), dead-reckoning sensors, a vehicle guidance system, and a database 46 coupled to a data processor.

In one embodiment, the user interface (28, 60, 2300) comprises a visual display 3000, alone or together with a touch screen module 2312 (or touch sensor system) integrated into the display 2310. The user interface (28, 60, 2300) may have a steering sensor, such as a steering angle sensor, a steering torque sensor, or both. The steering angle sensor, the torque sensor, or both may comprise a magnet embedded in a steering shaft in conjunction with a magnetic field sensor that detects movement of the magnet if and when the steering shaft is rotated.

As illustrated in FIGS. 2A and 2B, the user interface (28, 60, 2300) may further comprise a visual input such as a digital imaging system, a camera, a thermal imaging system, an infrared imaging system, or another optical sensor to sense or detect: (1) if the vehicle is manned or unmanned, (2) the state of alertness of the vehicle operator of the vehicle, (3) whether or not an implement is coupled to or associated with the vehicle, (4) whether or not an implement is raised, or lowered or engaging the ground, and (5) whether and if the operator is making gestures that can be interpreted to provided input data to the user interface (28, 60, 2300).

In one embodiment, the user interface (28, 60, 2300) may comprise a microphone and speech processing system (e.g., speech recognition module 2327) to support the input of operator commands or request for information from the data processor. For example, the speech processing system may comprise a speech recognition module 2327 for training and recognizing words or input commands or requests for information. Further, the user interface (28, 60, 2300) comprises an audio output device for providing feedback or information to the operator in response to operator requests, or otherwise.

In one configuration, the user interface (28, 60, 2300) optionally includes a haptic output, such as seat or steering wheel with a linear motor or motor that provides haptic feedback or vibration to an operator after the operator enters, is prompted to enter, or fails to enter timely an input into the user interface (28, 60, 2300), touch-screen equipped display, keypad, control, or switch inputs.

In one embodiment, the data processor has a data storage device for storing data or software instructions in one or more modules. In this document, modules may comprise software, electronic hardware, logic circuits, or any of the foregoing items. Within the second data processing system 52, a data storage device may store one or more of the following data or reference information: second operation pass data, worksite map 2120, harvested area 2122, unharvested areas and candidate passes, current machine location, current machine orientation, and planned path. The data processor may further store or contain a path planner and a vehicle guidance system 2400. The data processor may be associated with a communications interface or wireless communications link for communicating with a central server 40 or first data processing system 20 of a first vehicle to retrieve first operation pass data (e.g., from a database 46).

Accordingly, the system 2000 of FIG. 2A comprises a user interface (28, 60, 2300) that supports user prompts/ alerts, user acceptance, and autonomous control mode management of the vehicle path plan related to selection of a preferential pass from candidate passes 2124 via one or more of the following modules or components within the user interface (28, 60, 2300): (1) visual display 3000, (2) touch screen display or display configured with a touch screen module 2312, (3) visual input module or gesture recognition and control module, (3) speech processing and speech recognition module 2327, (4) haptic output module. The second data processing system 52 or data processor uses the benefit of the prior path of the implement, the first vehicle or both collected during the performance of an earlier work task during a growing period (e.g., season), the as-planted map of plants, or plant rows to establish a planned present path or candidate passes 2124 of the second vehicle during a later work task during the same growing period (e.g., season). The operator can man the cab or cockpit of the vehicle in a manual control mode, or wireless operate the vehicle through telepresence and wireless control mode. Further in both the manual control mode and wireless control mode, the second data processing system 52 may enter an autonomous control mode or a supervised autonomous control mode where the operator can override or select, preselect or rank one or more preferential passes from candidate passes 2124 or planned vehicle path from a library or menu of proposed candidate passes 2124. The operator may be provided with on-screen alerts on the visual display 3000, audio alarms, or haptic output (e.g., vibrating of the seat or steering wheel) to prompt the operator selection of one or more preferential passes from candidate passes 2124 during an authorized selection interval. After the authorized selection interval passes, in the autonomous mode the second data processing system 52 may be configured to automatically select the next pass or preferential pass or sequence of preferential passes from the library of candidate passes 2124.

However, in an alternate embodiment, in the absence of user input (e.g., selection) in response to on-screen alerts on the visual display 3000, audio alarms, or haptic output, the second data processing system 52 (e.g., in an autonomous mode) may stop movement of the second vehicle and wait for further commands or input from the operator, or may turn-off the second vehicle.

FIG. 2B is another embodiment of a block diagram of a system 11 for planning a path or executing a path of a vehicle.

The system 11 comprises first vehicle data processing system 20 or first vehicle electronics 20 that can communicate via a wireless communications network 36, and possibly via a communications network 38, to a central server 40. Similarly, the system 11 comprises a second vehicle data processing system 52 or second vehicle electronics 52 that can communicate via the wireless communications network 36, and possibly via the communications network 38, to the central server 40.

However, in an alternate embodiment, the first vehicle data processing system 20 and the second vehicle data processing system 52 may communicate directly with each other via a wireless communications signal (e.g., IEEE 802.11 standard or similar for wireless local area network), via a wireless communications channel, a satellite communications channel, or via the wireless communications network 36.

In another alternate embodiment, the first vehicle data processing system 20 and the first vehicle uses a first implement (e.g., planter) at a first time (e.g., earlier time) and a second implement (e.g., sprayer) at a second time (e.g., later time) to perform different agricultural tasks, such as a first work task (of planting crops or seeds) at a first time and a second work task (of treating or spraying the crops) at the second time. Accordingly, the first data storage device 24 within the first data processing system 11 stores data related to the performance of the first work task for later access while performing the second work task. During the first work task, the first-location determining receiver 30 may provide an as-planted map, seed positions, plant row locations, other plant position data, a recorded implement path or a recorded first vehicle path that is recorded during the performance of a first work task (e.g., planting, seeding, seed drilling, alone or together with nutrient or crop input application) in a field or work area for a growing period (e.g., growing season), where the foregoing data is recalled, retrieved or accessed from the first data storage device 24 during the performance of second work task by the first vehicle with the second implement.

As illustrated in FIG. 2B, the first data processing system 20 comprises a first data processor 22, a first data storage device 24, and data ports 26 that are coupled to a first data bus 34. A user interface (28, 60, 2300), a first location-determining receiver 30 and first wireless communications device are coupled to the data ports 26 or otherwise configured to communicate with the first data processor 22, the first data storage device 24 or both.

As shown, the second data processing system 52 comprises a second data processor 54, a second data storage device 56, and data ports 58 that are coupled to a second data bus 66. A user interface (28, 60, 2300), a second location-determining receiver 62 and second wireless communications device are coupled to the data ports 58 or otherwise configured to communicate with the second data processor 54, the second data storage device 56 or both.

In one configuration, the central server 40 comprises an electronic data processor 42, a data storage device 44, and a data port 50 that are coupled to a data bus 48. The data processor 42, the data storage device 44 and the data port 50 are configured to communicate with each other via the data bus 48. The data port 50 may comprise a transceiver, buffer memory, or both for communicating over the communications network 38, such as the internet, a public switched telephone network (PSTN), a fiber optic network, or another telecommunications network.

The first data processor 22, the second data processor 54 or any other data processor may comprise one or more of the following: an electronic data processor, a microprocessor, a microcontroller, an application specific integrated circuit (ASIC), digital signal processor (DSP), a programmable logic device, an arithmetic logic unit, or another electronic data processing device.

The first data storage device 24, the second data storage device 56, or any other data storage device may comprise electronic memory, registers, shift registers, volatile electronic memory, a magnetic storage device, an optical storage device, or any other device for storing data.

The first location-determining receiver 30, the second location-determining receiver 62 and any other location-determining receiver may comprise a satellite receiver, such as a global navigation satellite system (GNSS) receiver that is augmented by a wireless device (e.g., satellite receiver or cellular receiver) that can receive a correction signal (e.g., differential correction signal).

In FIG. 2B, the user interface (28, 60, 2300) may comprise one or more of the following: an electronic display, a liquid crystal display, a touch screen display, a keypad, a keyboard, a pointing device (e.g., an electronic mouse), an audio interface, a speech recognition system, speech recognition module 2327, one or more switches, or the like for inputting or receiving data, alerts, diagnostics, messages or commands, and outputting or transmitting data, alerts, diagnostics, messages, or commands.

In an alternate embodiment, the user interface (28, 60, 2300) of FIG. 2B may incorporate any modules, electronics, software instructions, logic, or components of the user interface (28, 60, 2300) illustrated in FIG. 2A.

In accordance with one embodiment, a method and system 11 of planning a path of a vehicle comprises defining or obtaining an outer boundary of a work area or a field. A first data processor 22 of a first vehicle records (e.g., in a data storage device onboard the vehicle or at a central server 40) and/or obtains (e.g., from a location-determining receiver) an implement path plan of an implement (e.g., first vehicle) associated with a first vehicle. For example, the first-location determining receiver may provide an as-planted map, seed positions, plant row locations, other plant position data, a recorded implement path or a recorded first vehicle path that is recorded during the performance of a first work task (e.g., planting, seeding, seed drilling, alone or together with nutrient or crop input application) in a field or work area for a growing period (e.g., growing season).

In one embodiment, the implement path plan comprises a series of recorded position points (e.g., GNSS two-dimensional or three-dimensional coordinates) along a recorded guidance path of an implement and a set of plant rows defined with reference to the recorded guidance path in the work area or the field.

The second vehicle is equipped with a second location determining receiver that provides a path plan for a second vehicle (e.g., sprayer, nutrient applicator, harvester or combine) or its implement (e.g., second implement) in the same field or work area and during the same growing period (e.g., growing season) as the first vehicle. Plant position data means one or more of any of the following plant, seed or seedling related data: as-planted map, seed positions, plant row locations, other plant position data, a recorded implement path or a recorded first vehicle path that is recorded during the performance of a first work task. The plant position data may be associated with a data collection date and time, a growing season identifier, a first vehicle identifier, a field or work area identifier or a geographic location. As described above, the first vehicle electronics or first data processing system 20 communicates, directly or indirectly, with the second vehicle electronics, such that the second data processing system 52, retrieves or has access to the following plant position data that was collected by the first data processing system 20, alone or in conjunction with the first location-determining receiver 30: as-planted map, seed positions, plant row locations, other plant position data, a recorded implement path or a recorded first vehicle path that is recorded during the performance of a first work task (e.g., planting, seeding, seed drilling, alone or together with nutrient or crop input application) in a field or work area for a growing period (e.g., growing season).

At the second vehicle during the performance of a second work task after the first work task for the same field, work area and growing period, a location-determining receiver determines a present position and present heading of a second vehicle in the work area or the field. A second data processor 54 determines a set (e.g. library) of one or more candidate passes 2124 of the second vehicle in alignment with the defined plant rows or other plant position data (e.g., communicated wirelessly from the central server 40 or from the first vehicle) to provide area coverage of the work area or field within the defined boundary based on an implement width or swath of the second vehicle and row spacing of the second vehicle, wherein the one or more candidate passes 2124 are associated with plant position data (e.g., the defined plant rows) consistent with a planned guidance path. From the present position and heading of the second vehicle, a user interface (28, 60, 2300) or visual display 3000 displays the determined candidate passes 2124 to manage, adjust or minimize overlap or spacing (e.g., spatial separation or row-skipping) of adjacent candidate passes 2124 (in or out of temporal sequence) of the second vehicle and to minimize any yield loss associated with unharvested/untreated passes or zones within the work area or field. Adjacent row passes may be out of temporal sequence or order where the second vehicle uses row skipping, for example. The user interface (28, 60, 2300) or visual display 3000 supports selection of one of the displayed or presented candidate passes 2124 as preferential pass or the planned guidance path of the second vehicle consistent with the provision of area coverage of the work area or field.

In one embodiment, the first vehicle may comprise the first data processing system 20 or first vehicle electronics 20; the second vehicle may comprise the second data processing system 52 or the second vehicle electronics 52. The first data processing system 20 may store one or more of the following plant position data and work area data in the first data storage device 24: boundary data, such as boundary coordinates, linear segments, or curves, implement path data, plant row data, planting data, as planted maps, implement swath width, implement row spacing, or other data. Work area data may comprise boundary data, such as boundary coordinates, linear segments, or curves, implement path data, or vehicle path data.

The first data processing system 20 comprises a first wireless communications device that can communicate the plant position data and/or work data from the first data processor 22 or from the first data storage device 24 to the wireless communications network 36 or to the second wireless communications device of the second data processing system 52 or second vehicle electronics 52 if the first wireless communications device and the second wireless communications device are within the transmission and reception range associated with the respective electromagnetic signals. For example, the first wireless communications device can support communications of plant position data and/or work area data from the first vehicle to the central server 40, first, via the wireless communications network 36 and, second, via the communications network 38 (e.g., internet).

At the central server 40, the data port is configured for communication the communications network 38. The plant position data and/or work area data can be communicated between the first vehicle and the second vehicle via the central server 40. For example, the plant position data and/or work area data communicated from the first vehicle data processing system 20 (to the central server 40) can be received at the data port, processed by the data processor and stored in the data bus for future reference or retrieval by an authorized operator of the second vehicle data electronics (e.g., second vehicle data processing system 52).

The second vehicle data processing system 52 can request, retrieve or access plant position data and/or work data that is stored in: (a) the database 46, (b) the first data storage device 24, (c) the second data storage device 56, and (d) data storage device 44 of the central server 40, where the request and storage of the work data can be organized by field location, field identifier, geographic region, growing period (e.g., growing season), date or other information. Accordingly, the second vehicle data processing system 52 can download, access or retrieve work data from previous work tasks or jobs within the same field or work area for the growing period (e.g., growing season), date or time of interest to coordinate, build upon or augment previous work tasks in a seamless manner with new or planned work task or with an efficient transition to complete an overall task such as full crop cycle management from planting until harvesting, which comprises one or more previous task and one or more planned work tasks.

FIG. 3 shows an illustrative display screen or visual display 3000 on a user interface (28, 60, 2300) for the method and system 11. For example, FIG. 3 illustrates a visual display 3000 that can be used as part of step 1400 in FIG. 1A to display one or more textual, visual or graphical representations of candidate passes 2124 for selection or entry by an operator or end user of the second vehicle.

As illustrated in FIG. 3, the screen or visual display 3000 is divided into three distinct areas or display regions: guidance lightbar 3200, whole field progress 3100, and upcoming pass area 3300.

On the upper portion of the visual display 3000, the guidance lightbar 3200 has lights that assist an operator of the vehicle in steering along a guidance path. In the example of FIG. 3, guidance light bar 3200 displays the vehicle position, as indicated by an associated heading or yaw angle of the vehicle. Colored indicators, such as green visual indicators 3210, yellow visual indicators 3220, and red visual indicators 3230 on the screen are used by the operator to follow a planned path.

For example, the guidance lightbar 3200 of the user interface (28, 60, 2300) may have software instructions in the data processing system (11 or 2000) to display, activate or deactivate visual indicators (3210, 3220, 3230) as follows. If the operator is steering the heading of the vehicle in alignment with the target path, target guidance line or target contour, the center or green visual indicator 3210 (e.g., light, light-emitting diode (LED), virtual light or virtual LED) may be illuminated. However, if the vehicle deviates slightly to the left of the target path, one or more intermediate left visual indicators 3220 (e.g., yellow lights, LEDs, virtual lights or virtual LEDs) are activated. Similarly, if the vehicle deviates slightly to the right of the target path, one or more intermediate right visual indicators 3220 (e.g., yellow lights, LEDs, virtual lights or virtual LEDs) are activated. If the vehicle deviates severely to the left of the target path, one or more intermediate left visual indicators 3230 (e.g., red lights, LEDs, virtual lights or virtual LEDs) are activated. If the vehicle deviates severely to the right of the target path, one or more intermediate right visual indicators 3230 (e.g., red lights, LEDs, virtual lights or virtual LEDs) are activated.

As illustrated on a left rectangular portion of the visual display 3000, the whole field progress area 3100 shows harvested areas 2122, such as harvested passes 3130, with a first cross-hatch pattern and headlands 3120 with a second cross-hatch pattern indicative of a harvested state. Meanwhile, the unharvested areas are not cross-hatched or are cross-hatched with different cross-hatch pattern distinct from the first cross-hatch pattern and/or the second cross-hatch pattern. The vehicle symbol 3110 in the headlands 3120 may indicate a current position of the second vehicle (e.g., combine or harvester), where the second vehicle is progressing through or performing a harvesting operation in the headlands 3120. The whole field progress area shows pass numbers 3150, which include unharvested passes 3140 (labeled pass numbers 6 through 11, inclusive) and harvested passes 3130 (labeled pass numbers 1-5, inclusive).

In other embodiments, harvested areas may be colored, shaded or patterned to represent harvested yield level; whereas unharvested areas may be without color or colored, shaded or patterned to indicate an unharvested or fallow state. In one embodiment, unharvested passes 3140 may also have a distinctive pattern or color based on predicted yield, which can be based on historic yield and an observed yield for other portions of the field harvested during a growing period (e.g., growing season). In certain configurations, a set of passes within the whole field progress area of the visual display 3000 are numbered 3158. Here, as illustrated in FIG. 3, the passes (e.g., harvested passes 3130, unharvested passes 3140, or both) are labeled consecutively from 1 to 11, although any other pass identifiers, such as numeric or alphanumeric descriptions, icons or symbols could be used to indicate different passes or candidate passes 2124.

Turning to the candidate pass area or upcoming pass area 3300 on the right side of the visual display 3000 of FIG. 3, the candidate passes 2124 are assigned corresponding pass identifiers (3310), such as pass numbers 3310 eight through eleven. In one embodiment, upcoming pass area 3300 shows pass numbers 3310 and corresponding transition distance 3320 (e.g., turn distance), which are distances of travel of the vehicle before turning or transitioning to enter or approach the candidate pass, where the second data processing system 52 updates the distance of travel are on dynamic, regular basis. The passes shown in this view are all ahead of the second vehicle in its direction of travel. In other examples, the upcoming pass area may show the next N candidate passes 2124 or next M candidate unharvested passes, where N and M are any positive whole numbers or integers greater than zero.

In one embodiment, the visual display 3000 may be presented on a touch screen display or display 2310 associated with touch screen module 2312. The operator may select the next pass or preferential pass or sequence of passes by pressing or contacting the preferential pass or sequence of passes in a selected, pressed portion or contacted portion of upcoming pass area 3300 of the visual display 3000. Further, the touch screen display or touch screen module 2312 is configured such that if the operator selects multiple candidate passes 2124 in a certain order, the preferential pass or next passes will be executed by the second vehicle in the same certain order or sequence (e.g., until all of the next passes are executed). Accordingly, based on the information in upcoming pass area 3300 and whole field progress area 3100, the operator can interact with the visual display 3000 or the user interface (28, 60, 2300) to select or enter the next pass.

Other embodiments may use other ways of selecting a subset of all displayed candidate passes 2124 for tracking or execution by the second vehicle.

In an alternate embodiment, user interface (28, 60, 2300) could display pass-specific information in the whole field progress area 3100 and the upcoming pass area 3300 could be absent. Accordingly, the pass-specific information, such as some upcoming pass information (similar to the upcoming pass area 3300) could be displayed in the whole field progress area 3100 in a larger typeface that utilizes the screen area formerly or previously allotted in the upcoming pass area.

Figure 4:
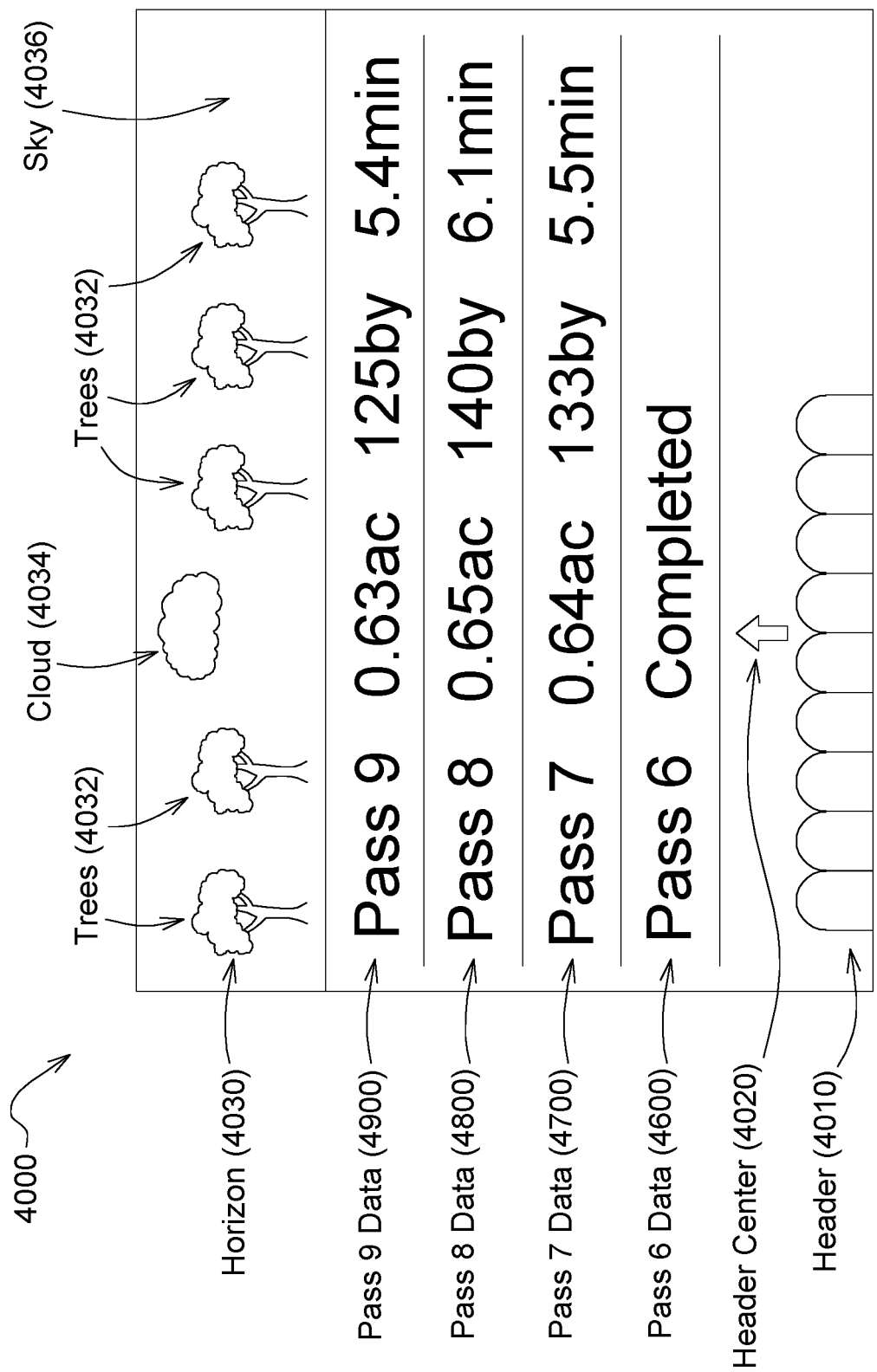
FIG. 4 is another illustrative embodiment of a possible screen appearing on a display or user interface associated with selection of candidate passes.

FIG. 4 shows another example of a screen or visual display 4000 for display on the user interface (28, 60, 2300) for the method and system 11. For example, the visual display 4000 can be used as part of step 1400 of FIG. 1A to display at least one candidate pass or a set of candidate passes 2124 as an option for operator selection. As illustrated in FIG. 4, the majority of the screen or visual display 4000 is used to display one or more of the following: (a) candidate pass information, (b) candidate pass information in ranked order or proposed sequence of execution by the second vehicle, (b) completed pass information. Other areas of the display 4000 comprise an implement representation 4010 (e.g., header 4010 of harvester or combine as the second vehicle) and its position or alignment (e.g., header center 4020) and an artificial horizon 4030 representative of an end of the field with trees 4032, clouds 4034, and sky 4036.

As illustrated in the example of FIG. 4, pass data (4600, 4700, 4800, and 4900) comprises the pass number, land area (e.g., acres, square feet or square meters) of unharvested land in the corresponding candidate pass, estimated yield (e.g., bushels of grain) of the unharvested crop in the corresponding candidate pass, and estimated time to harvest the crop in the corresponding candidate pass based on average or historic harvesting speed. The data processing system 11 or second data processing system 52 can determine or estimate a land area of unharvested crop based on the estimated location of the candidate pass and which portions or candidate passes 2124 have already been harvested. The data processing system 11 or second data processing system 52 can estimate the yield of the unharvested crop from a crop model, similarity to other harvested areas in the field, historic harvest data from the field, rows, area or portion of the field in one or more previous years, pre-harvest aerial images, or any other suitable means.

In one embodiment, the data processing system 11 or second data processing system 54 may estimate the time to complete harvest via the candidate pass based on the crop area, estimated crop yield, and a model of how fast the combine can move through the crop given the estimated yield. In an alternate embodiment, the data processing system 11 may use models, empirical measurements, historic crop processing times (e.g., for a corresponding field, county, township, province, canton, country or other region), or other approaches to estimate the time.

In some embodiments, the operator could tap or touch the user interface (28, 60, 2300) or touch screen module 2312 of the user interface or display to select the next pass from the set or library of candidate passes 2124 displayed on the user interface. After the operator selects a preferential pass from the candidate passes 2124, the data processing system 11, second data processing system 54, or the path planner 2150 is adapted to generate a path plan or planned path 2152 for use by an automated vehicle guidance system 2400.

In examples involving seeding and chemical application, the data processing system 11 or system 2000 may receive input via the user interface (28, 60, 2300) to associate the candidate pass with respective pass data including without limitation: an area of the respective candidate pass, seed or chemical required for the respective candidate pass, whether or not the candidate or preferential pass can be completed with the remaining amount of seed or chemical (to avoid refilling and returning to a place mid-pass to resume), time to make pass, or any other suitable information.

In examples involving ground engagement of ground engaging tools associated with the vehicle or its implement, the data processing system 11 or system 2000 may receive input via the user interface (28, 60, 2300) to associate the pass data with an area of respective candidate pass, estimated time to complete respective candidate pass, fuel to make a respective candidate pass or ability to complete pass with existing fuel, probability of getting stuck, amount of soil or soil cover being moved, or any other suitable information.

Figure 5:
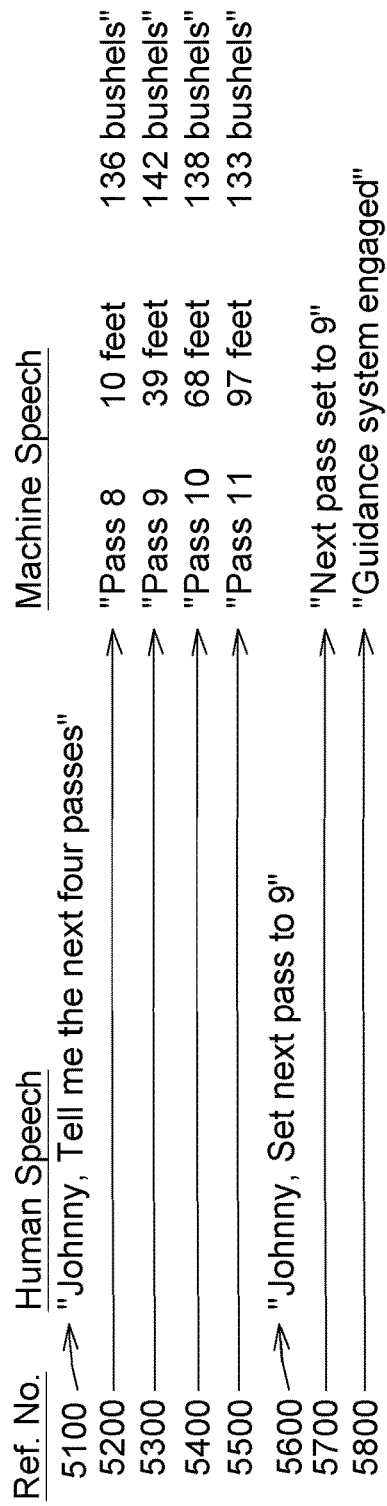
FIG. 5 is an illustrative embodiment of an audible communication of an operator via the user interface associated with the selection of candidate passes.

In another embodiment, which is illustrated in FIG. 5, upcoming pass or candidate pass data may be made available through an audio interface (e.g., audio input, audio output or both) with speech recognition module 2327 to address ergonomics and human factors of the user interface (28, 60) such as to eliminate small type, lines, or icons, or to provide an interface for visually impaired operators, or where glare or direct sunlight prevents legible viewing of a display, or otherwise.

FIG. 5 shows another example where upcoming pass area 3300 of FIG. 3 is absent from a visual display 3000 or whether the visual display 3000 of the user interface (28, 60, 2300) is not present or inactive. Here in FIG. 5, the processing system 11 or electronic data processor 2100 can use audio output device 2320 and audio input device 2325 of the user interface (28, 60, 2300) to communicate or interact with an operator or user of the first vehicle, second vehicle or both. In one embodiment, the user interface (28, 60, 2300) or audio input device 2325 may be responsive to, awoken by, or activated by an operator command (e.g., spoken or verbal operator command), wake command or wake word that is recognized by the audio input device 2325 or speech recognition module 2327 of or within the audio input device 2325. In one illustrative configuration, the user interface (28, 60, 2300) or audio input device 2325 remains ready for an operator command (e.g., spoken or verbal operator command) for a wake period or ready state of a predetermined duration or user-definable duration (e.g., 30 seconds or one minute). After the human operator speaks the wake word or wake command to the user interface (28, 60, 2300), audio input device 2325 or speech recognition module 2327, the operator can provide a subsequent command (e.g., spoken or verbal command).

For example, as set forth in FIG. 5, the wake word of human speech is "Johnny" and the illustrative subsequent command is "Tell me the next four passes." In some embodiments, the speech recognition module 2327, audio input device, user interface (28, 60, 2300) or data processing system (11, 2000) is able to use context or other information to reduce the need for every human line to start with the wake word. In FIG. 5, the leftmost column shows reference line numbers 5100 through 5800, where some reference numbers refer to human speech and other reference numbers refer to machine speech or machine feedback. For example, the middle column shows human speech (lines 5100 and 5600). The right column shows machine speech or machine feedback (e.g., of the combine, machine or other vehicle), which may be responsive to the human speech in the middle column. For instance, the right column shows machine speech associated with respective reference number lines 5200 through 5500, inclusive, and 5700 through 5800, inclusive. In reference lines 5200 through 5500, user interface (28, 60, 2300) or data processing system (11, 2000), or audio output device (2320) communicates the pass identifier, the transition point distance to start of the pass associated with the pass identifier, and the estimated yield per acre within the pass associated with the pass identifier. For example, pass identifier 8 has a transition point distance of 10 feet and an estimated yield of 136 bushels per acre for pass identifier 8; pass identifier 9 has a transition point distance of 39 feet and an estimated yield of 142 bushels per acre for pass identifier 9; pass identifier 10 has a transition point distance of 68 feet and an estimated yield of 138 bushels per acre for pass identifier 10; pass identifier 11 has a transition point distance of 97 feet and an estimated yield of 133 bushels per acre for pass identifier 11.

Figure 6:
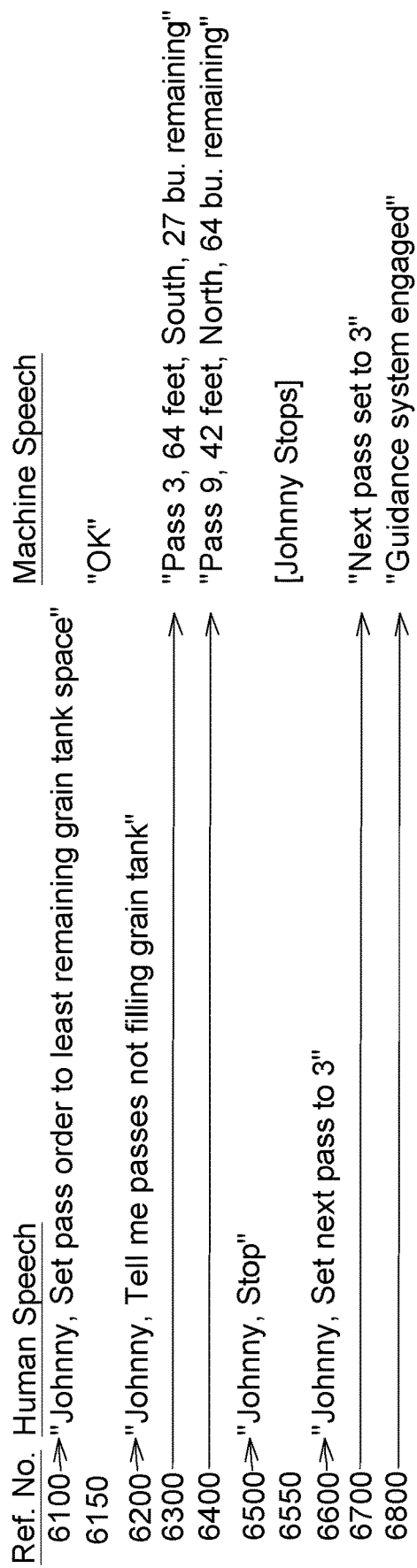
FIG. 6 is another illustrative embodiment of an audible communication of an operator via the user interface associated with the selection of candidate passes.

The example of FIG. 6 is similar to the example of FIG. 5, except FIG. 6 shows another example of audio dialogue between the human operator and the user interface (28, 60, 2300) of the machine (e.g., combine or harvester). In FIG. 6, the leftmost column shows reference line numbers 6100 through 6800, where some reference numbers refer to human speech and other reference numbers refer to machine speech or machine feedback. For example, the middle column shows human speech (lines 6100, 6200, 6500 and 6600). At lines 6150, 6300, 6400, 6700, and 6800, the right column shows machine speech or machine feedback (e.g., of the combine, machine or other vehicle), which may be responsive to the human speech in the middle column.

Here, in line 6100, after the wake word, "Johnny," the operator gives the following human speech command, "Set pass order to least remaining grain tank space," to sequence the order in which audio data is outputted or presented to the operator based on passes with the least harvested material (e.g., bushels of harvested material) because of limited remaining space in grain tank or storage container for storing harvested material associated with the vehicle (e.g., combine or harvester). In line 6150, user interface (28, 60, 2300) or audio output device 2320 responds with machine speech output, such as "okay," "OK", "yes", "affirmative," or similar audio output acknowledgement.)

In line 6200, the operator issues the verbal command, "Johnny, tell me passes not filling (overfilling) grain tank," to the user interface (28, 60, 2300). In response, the user interface (28, 60, 2300) responds at reference number lines 6200 through 6400. In reference lines 6200 through 6400, user interface (28, 60, 2300) or data processing system (11, 2000), or audio output device (2320) communicates the pass identifier, the transition point distance to start of the pass associated with the pass identifier, and the estimated yield per acre within the pass associated with the pass identifier. For example, pass identifier 3 has a transition point distance of 64 feet and an estimated yield of 27 bushels per acre for pass identifier 3; pass identifier 9 has a transition point distance of 42 feet and an estimated yield of 64 bushels per acre for pass identifier 9.

In line 6500, after hearing pass identifier 3 and pass identifier 9 in reference lines 6300 and 6400, respectively, in reference line 6500 the operator has heard enough options and stops recitation of the list by stating "Johnny, stop." At reference line, 6550, the user interface (28, 60, 2300) stops reciting and optionally acknowledges "stop confirmed."

In line 6600, via the user interface (28, 60, 2300), the operator issues a speech command to set the next preferential pass to candidate pass 3 which is associated with the lowest yield of harvested material for the candidate pass. In line 6700, the user interface (28, 60, 2300) acknowledges that the preferential pass or "next pass is set to 3." Further, in line 6800, the user interface (28, 60, 2300) acknowledges that the preferential pass has a vehicle guidance system 2400 engaged, such as auto-steering or guidance provided by a second location-determining receiver 62 that controls a steering actuator for steering or directing the heading or yaw angle of the second vehicle.

Figure 7:
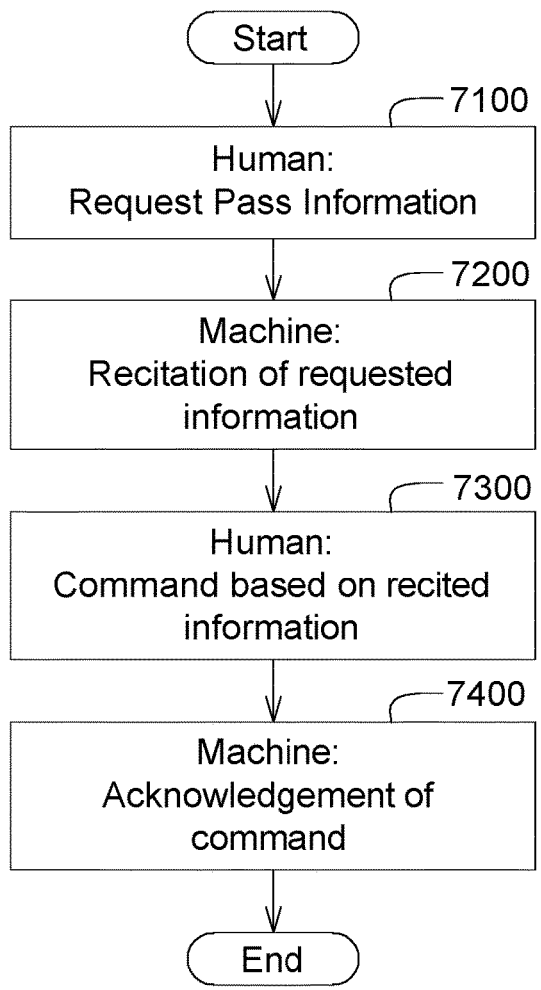
FIG. 7 is a flow chart of a method for audible communication of an operator with the user interface.

In the human-machine audio dialog of FIG. 5 and FIG. 6, there are some general or common features as noted in the method of FIG. 7. The method of FIG. 7 begins in step 7100.

In step 7100, via the user interface (28, 60, 2300), the speech recognition module 2327, or the audio input device 2325, the human operator requests pass information, such as candidate pass information or a ranking of potential candidate passes 2124. For example, in FIG. 5, the operator requested pass information in line 5100, whereas in FIG. 6 the operator requested pass information in line 6200.

In step 7200, via the user interface (28, 60, 2300) or the audio output device 2320, the data processing system 11 on the machine recites the requested information, on candidate passes 2124 or next passes of the vehicle, as requested in step 7100. For example, in FIG. 5, the user interface (28, 60, 2300) or audio output device 2320 recited information on lines 5200 through 5500, inclusive; in FIG. 6, the user interface (28, 60, 2300) or audio output device 2320 recites information on lines 6300 through 6400, inclusive.

In step 7300, via the user interface (28, 60, 2300) the speech recognition module 2327, or the audio input device 2325, the human operator inputs or issues a command for action based on the information recited or provided by the user interface (28, 60, 2300) or audio output device 2320 in step 7200. In one example, in line 5600 of FIG. 5, the operator issues a command based on the recited information, such as a command to select or establish a preferential pass or next pass based on one or more previously recited candidate passes 2124 by the machine. Similarly, in FIG. 6 in line 6600, the operator issued a command to select or set the preferential pass or next pass from the set or library of candidate passes 2124 provided by the user interface (28, 60, 2300) in steps 6300 through 6400, inclusive.

In step 7400, the user interface (28, 60, 2300) or audio output device 2320 provides an acknowledgement of the command entered, spoken or input by the human operator into the user interface (28, 60 2300) or audio input device 2320 of the data processing system (11, 2000). For example, in FIG. 5, the user interface (28, 60, 2300) provides the acknowledgement set forth in lines 5700 through 5800, inclusive; whereas in FIG. 6 the user interface (28, 60, 2300) provides the acknowledgement set forth in lines 6700 through 6800, inclusive. In some illustrative configurations, acknowledgements may take one of several forms without limitation: (a) complete or execute the user-requested action or command, verbally acknowledge success or failure; (b) verbally acknowledge processing the speech, complete or execute the action; and (c) verbally acknowledge processing the speech, do the action, acknowledge success or failure of the action.

Figure 8:
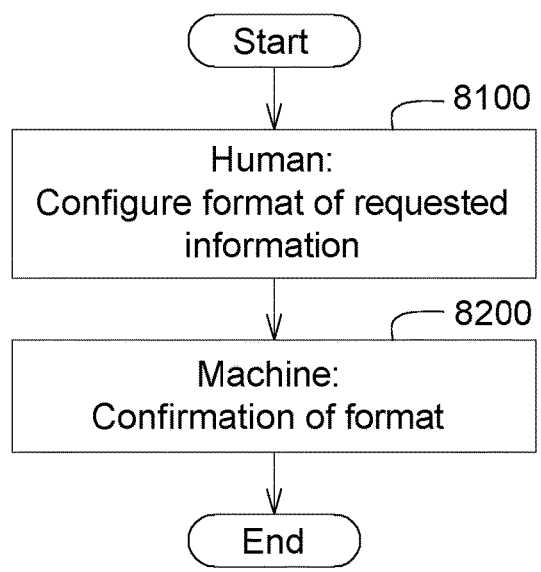
FIG. 8 is a flow chart of a method for entry of commands of an operator associated with a user interface.

FIG. 8 depicts a method for formatting speech output by a human operator consistent with a specification or defined format. The method of FIG. 8 begins in step 8100.

In step 8100, via the user interface (28, 60, 2300) the speech recognition module 2327, or the audio input device 2325, the human operator requests configuration of the format (e.g., sequence, order or structure) of requested information. For example, in FIG. 6 at line 6100, the human operator provides a search limiter or "sort by" criteria for a list, set or library of candidate passes 2124. In another example, the human operator may provide or specify an automatic or on-demand report out. In the former case, without limitation, automated reports may be based on a time, location, or operational condition.

In step 8200, via the user interface (28, 60, 2300) or audio output device 2320, the human operator provides a confirmation of the selected format, default format or accepted format. For example, rather than asking for information at the end of each pass, as a default format the information or next passes or candidate passes 2124 are presented at a specified distance or at specified time (e.g., after the lapse of a user-definable timer or user-definable alarm provided, such as audibly or verbally, via the user interface) from the end of the pass.

Having described the preferred embodiment, it will become apparent that various modifications can be made without departing from the scope of the invention as defined in the accompanying claims.

What is claimed is:

1. A method of planning a path of a vehicle, the method comprising:
   obtaining an outer boundary of a work area;
   obtaining a series of recorded position points of a first vehicle along a recorded guidance path at the work area, wherein the recorded guidance path comprises a plurality of individual passes;
   identifying plant data indicative of a plurality of estimated positions of individual plant rows across a width of each individual pass, of the plurality of individual passes, at the work area based on the series of recorded position points of the first vehicle along the recorded guidance path at the work area and lateral offsets indicative of a plurality of lateral offsets between components of the first vehicle;
   identifying present positions and present headings of a second vehicle in the work area;
   identifying a set of candidate first passes of the second vehicle to provide area coverage of the work area within the outer boundary of the work area and to avoid contact between one or more components of the second vehicle and the individual plant rows based on dimensions of the second vehicle and the plurality of estimated positions of the individual plant rows across the width of each individual pass, of the plurality of individual passes, at the work area, wherein the identified set of candidate first passes comprises a plurality of candidate first passes;
   identifying a respective efficiency of each candidate first pass of the identified set of candidate first passes, the respective efficiency of each candidate first pass indicative of a ratio of estimated unharvested plant yield for the corresponding candidate first pass to estimated harvested plant yield for the work area;
   ranking each candidate first pass based on the respective efficiency of each candidate first pass, of the identified set of candidate first passes, to form a ranked order of the identified set of candidate first passes; and
   from a first present position and a first present heading of the second vehicle, presenting in a user interface of the second vehicle the identified set of candidate first passes in the ranked order for operator selection of one candidate first pass of the presented identified set of candidate first passes as a planned first pass guidance path of the second vehicle.

2. The method of claim 1, wherein the first vehicle includes an associated first implement and the second vehicle includes an associated second implement.

3. The method of claim 1 and further comprising:
   detecting a pass transition indicative of the second vehicle having traveled along the selected planned first pass guidance path.

4. The method of claim 3 and further comprising:
   based on the detected pass transition, dynamically identifying a set of candidate second passes of the second vehicle to provide area coverage of a remaining area of the work area untraveled by the second vehicle within the outer boundary of the work area to avoid overlap and to avoid contact between the one or more components of the second vehicle and the individual plant rows, based on dimensions of the second vehicle and the plurality of estimated positions of the individual plant rows across the width of each individual pass, of the plurality of individual passes, at the work area.

5. The method of claim 4 and further comprising:
   from a second present position and a second present heading of the second vehicle, presenting the identified set of candidate second passes for operator selection of one candidate second pass of the presented identified set of candidate second passes as a planned second pass guidance path of the second vehicle.

6. The method of claim 5, wherein presenting the identified set of candidate second passes comprises presenting the identified set of candidate second passes in a ranked order.

7. The method of claim 6, wherein presenting the identified set of candidate second passes in a ranked order comprises:
   identifying a respective efficiency of each candidate second pass of the identified set of candidate second passes; and
   ranking each candidate second pass based on the respective identified efficiency of each candidate second pass, of the identified set of candidate second passes, to form the ranked order of the identified set of candidate second passes.

8. The method of claim 1, wherein identifying the set of candidate first passes of the second vehicle to provide area coverage of the work area within the outer boundary of the work area and to avoid contact between one or more components of the second vehicle and the individual plant rows, based on dimensions of the second vehicle and the plurality of estimated positions of the individual plant rows across the width of each individual pass, of the plurality of individual passes, at the work area comprises:
   identifying the set of candidate first passes of the second vehicle to provide area coverage of the work area within the outer boundary of the work area and to align tires or tracks of the second vehicle, as the one or more components of the second vehicle, with space of the work area between individual plant rows, to avoid contact between the tires or tracks of the second vehicle and the individual plant rows, based on dimensions of the second vehicle and the plurality of estimated positions of the individual plant rows across the width of each individual pass, of the plurality of individual passes, at the work area.

9. The method of claim 1, wherein presenting the identified set of candidate first passes in the ranked order comprises presenting the identified set of candidate first passes in order of ascending numerical rank.

10. A system of planning a path of a vehicle, the system comprising:
    one or more data processors configured to:
      obtain an outer boundary of a work area;
      obtain a series of recorded position points of a first vehicle along a recorded guidance path at the work area;
      identify plant data indicative of estimated positions of individual plant rows at the work area based on the series of recorded position points of the first vehicle along the recorded guidance path at the work area and lateral offsets between components of the first vehicle indicative of a row spacing of the first vehicle;
      identify present positions and present headings of a second vehicle in the work area; and
      identify a set of candidate first passes of the second vehicle to provide individual plant row area coverage of a defined set of individual plant rows within the work area within the outer boundary of the work area and to avoid contact between one or more components of the second vehicle and the defined set of individual plant rows, based on dimensions of the second vehicle and the estimated positions of the individual plant rows at the work area, wherein the set of candidate first passes comprises a plurality of candidate first passes;
identify a respective efficiency of each candidate first pass of the identified set of candidate first passes, the respective efficiency of each candidate first pass indicative of a ratio of estimated unharvested plant yield for the corresponding candidate first pass to estimated harvested plant yield for the work area;
rank each candidate first pass based on the respective efficiency of each candidate first pass, of the identified set of candidate first passes, to form a ranked order of the identified set of candidate first passes; and
a user interface of the second vehicle configured to present, from a first present position and a first present heading of the second vehicle, the identified set of candidate first passes in the ranked order for operator selection of one candidate first pass of the presented identified set of candidate first passes as a planned first pass guidance path of the second vehicle.

11. The system of claim 10, wherein the first vehicle includes an associated first implement and the second vehicle includes an associated second implement.

12. The system of claim 10, wherein the one or more processors are further configured to:
detect a pass transition indicative of the second vehicle having traveled along the selected planned first pass guidance path; and
identify, in response to the detected pass transition, a set of candidate second passes of the second vehicle to provide individual plant row area coverage of a defined set of individual plant rows within a remaining area of the work area untraveled by the second vehicle within the outer boundary of the work area or to avoid overlap and to avoid contact between the one or more components of the second vehicle and the individual plant rows, based on dimensions of the second vehicle and the estimated positions of the individual plant rows within the remaining area of the work area.

13. The system of claim 12, wherein the user interface is further configured to:
present, from a second present position and a second present heading of the second vehicle, the identified set of candidate second passes for operator selection of one candidate second pass of the presented identified set of second candidate passes as a planned second pass guidance path of the second vehicle.

14. The system of claim 13, wherein the one or more processors are further configured to:
rank each candidate second pass of the identified set of candidate second passes and wherein the user interface is configured to present the identified set of candidate second passes in ranked order based on the rank of each candidate second pass of the identified set of candidate second passes.

15. The system of claim 12, wherein the set of candidate second passes comprises a plurality of candidate second passes, wherein the one or more components of the second vehicle comprise tires or tracks, and wherein each candidate first pass of the set of identified candidate first passes and each candidate second pass of the set of identified candidate second passes align the tires or tracks with spaces between the estimated positions of the individual plant rows at the work area.

16. The system of claim 10, wherein the user interface is configured to present the identified set of candidate first passes in the ranked order by presenting the identified set of candidate first passes in order of ascending numerical rank.

* * * * *